US008463596B2

(12) United States Patent
Tsunokawa et al.

(10) Patent No.: US 8,463,596 B2
(45) Date of Patent: Jun. 11, 2013

(54) SELECTING AN OPTIMAL PROPERTY OF A KEYWORD ASSOCIATED WITH PROGRAM GUIDE CONTENT FOR KEYWORD RETRIEVAL

(75) Inventors: Motoki Tsunokawa, Kanagawa (JP); Kenichiro Kobayashi, Kanagawa (JP)

(73) Assignee: Sony Corporation, Toyko (JP)

( * ) Notice: Subject to any disclaimer, the term of this patent is extended or adjusted under 35 U.S.C. 154(b) by 1423 days.

(21) Appl. No.: 11/901,886

(22) Filed: Sep. 19, 2007

(65) Prior Publication Data
US 2008/0077398 A1    Mar. 27, 2008

(30) Foreign Application Priority Data

Sep. 21, 2006  (JP) ................................ P2006-255797

(51) Int. Cl.
*G06F 17/21*   (2006.01)
*G06F 17/27*   (2006.01)
*G06F 17/20*   (2006.01)

(52) U.S. Cl.
USPC ...................................... 704/10; 704/1; 704/9

(58) Field of Classification Search
None
See application file for complete search history.

(56) References Cited

U.S. PATENT DOCUMENTS

| 5,297,039 | A  | * | 3/1994  | Kanaegami et al. | ................... 1/1 |
| 7,630,946 | B2 | * | 12/2009 | Acharya | ......................... 706/45 |
| 2002/0087979 | A1 | * | 7/2002  | Dudkiewicz et al. | ........... 725/34 |
| 2002/0120925 | A1 | * | 8/2002  | Logan | ................................ 725/9 |
| 2003/0093260 | A1 | * | 5/2003  | Dagtas et al. | ..................... 704/1 |
| 2004/0181391 | A1 | * | 9/2004  | Inoue et al. | ...................... 704/10 |
| 2007/0271286 | A1 | * | 11/2007 | Purang et al. | ................. 707/101 |
| 2008/0295132 | A1 | * | 11/2008 | Icho et al. | ....................... 725/46 |

FOREIGN PATENT DOCUMENTS

| JP | 6-149887    | 5/1994  |
| JP | 6-350546    | 12/1994 |
| JP | 2001 75989  | 3/2001  |
| JP | 2005 115790 | 4/2005  |

* cited by examiner

*Primary Examiner* — Jesse Pullias
(74) *Attorney, Agent, or Firm* — Frommer Lawrence & Haug LLP; William S. Frommer; Ellen Marcie Emas

(57) ABSTRACT

An information processing apparatus includes an extracting unit that extracts a plurality of words serving as keywords of content from content information that describes the content, a property dictionary storage unit that stores a property dictionary containing the properties of the words, a property searching unit that searches the property dictionary for the properties of the plurality of words, a property determining unit that determines whether each of the properties of a target word to be processed and selected from among the words serving as keywords matches any of the different words other than the target word among the words serving as keywords or whether each of the properties of a target word matches any of the properties of the different words, and a determination unit that determines the representative property of the target word on the basis of a match count determined by the property determining unit.

10 Claims, 16 Drawing Sheets

FIG. 4

| WORD | PROPERTY |
|---|---|
| CATTLE | ANIMAL, FOOD |
| BARBECUE | FOOD |
| MEAT | FOOD |
| FOODSTUFF | FOOD |
| VARIETY PROGRAM | PROGRAM GENRE |
| WORLD CUP | SPORTS EVENT (SOCCER), SPORTS EVENT (VOLLEYBALL) |
| GOAL | SPORTS TERM (SOCCER), SPORTS TERM (ATHLETICS) |
| DIET | ORGANIZATION, ARCHITECTURE |
| LOWER HOUSE | ORGANIZATION |
| UPPER HOUSE | ORGANIZATION |
| ... | ... |

FIG. 9

| WORD | RELATED WORD | RELATIONSHIP |
|---|---|---|
| CATTLE | ANIMAL | HYPERNYM |
| CATTLE | MEAT | RELEVANT TERM |
| BARBECUE | FOOD | HYPERNYM |
| BARBECUE | MEAT | RELEVANT TERM |
| FOODSTUFF | FOOD | SYNONYM |
| FOODSTUFF | RECIPE | HYPERNYM |
| DIET | LOWER HOUSE | HYPONYM |
| DIET | UPPER HOUSE | HYPONYM |
| LOWER HOUSE | DIET | HYPERNYM |
| LOWER HOUSE | UPPER HOUSE | RELEVANT TERM |
| UPPER HOUSE | DIET | HYPERNYM |
| UPPER HOUSE | LOWER HOUSE | RELEVANT TERM |
| ANIMAL | CREATURE | SYNONYM |
| ANIMAL | LIVING THINGS | HYPERNYM |
| FOOD | COOKING INGREDIENT | HYPONYM |
| FOOD | BARBECUE | HYPONYM |
| ⋮ | ⋮ | ⋮ |

SELECTING AN OPTIMAL PROPERTY OF A KEYWORD ASSOCIATED WITH PROGRAM GUIDE CONTENT FOR KEYWORD RETRIEVAL

CROSS REFERENCES TO RELATED APPLICATIONS

The present invention contains subject matter related to Japanese Patent Application JP 2006-255797 filed in the Japanese Patent Office on Sep. 21, 2006, the entire contents of which are incorporated herein by reference.

BACKGROUND OF THE INVENTION

1. Field of the Invention

The present invention relates to an apparatus and a method for processing information and a program and, in particular, to an apparatus and a method for processing information and a program that can select one of the properties of keywords associated with content so that the selected property is optimal for the content.

2. Description of the Related Art

In recent years, television receivers that search for content on the basis of a keyword and display the found content have been developed (refer to, for example, Japanese Unexamined Patent Application Publication No. 2005-115790).

To retrieve a keyword associated with the content, words in the annotation of the content are retrieved, for example.

In this keyword retrieval method, morphological analysis is performed on the annotation of the content, for example. As a result, the words in the annotation are separated, and a word type of each of the separate words is identified. Thereafter, for instance, a word determined to be a noun is retrieved as a keyword. For example, when morphological analysis is performed on the sentence "I ate salmon yesterday", words "salmon" and "yesterday" tagged with the word type "noun" are retrieved as keywords.

In such a case, using the retrieved keywords "salmon" and "yesterday", content having an annotation including these keywords is searched for.

In addition, by using a property dictionary that defines the property of a word, such as a "street name", a "personal name", a "cooking ingredient", an "organization", or an "animal", the property can be assigned to the separate word in addition to a word type.

SUMMARY OF THE INVENTION

However, the word may have a plurality of the properties. For example, the word "salmon" may have two properties "cooking ingredient" and "fin". In this case, depending on which property of the plurality of properties is employed as the property of the word serving as a keyword, content that is semantically different from the content associated with the keyword may be searched for.

For example, when content associated with Soccer World Cup is displayed and the annotation of the content is a sentence "This program collects famous scenes about World Cup", the word (phrase) "World Cup", which has two properties "soccer" and "volleyball", is retrieved as a keyword. In such a case, if the property "volleyball" is employed as the property of the key word "World Cup", content having an annotation containing the word "World Cup" having the property "volleyball" is searched for.

Accordingly, the present invention provides an apparatus and a method for processing information and a program that can select one of the properties of a keyword associated with content so that the selected property is optimal for the content.

According to an embodiment of the present invention, an information processing apparatus includes extracting means for extracting a plurality of words serving as keywords of content from content information that describes the content, property dictionary storage means for storing a property dictionary containing the properties of the words, property searching means for searching the property dictionary for the properties of the plurality of words serving as keywords, property determining means for determining whether each of the properties of a target word to be processed and selected from among the words serving as keywords matches any of the different words other than the target word among the words serving as keywords or determining whether each of the properties of a target word matches any of the properties of the different words, and determination means for determining a representative property of the target word of the content on the basis of a match count between the properties of the target word and the different words or the properties of the different words determined by the property determining means.

The information processing apparatus can further include thesaurus storage means for storing a thesaurus that contains related words of the plurality of words and related-word searching means for considering a property of the target word, as one of the plurality of words, and searching the thesaurus for a related word of the one of the plurality of words. The property determining means can further determine whether the related word of the property of the target word matches any of the different words or any of the properties of the different words.

The information processing apparatus can further include thesaurus storage means for storing a thesaurus that contains related words of the plurality of words and related-word searching means for considering a property of the target word, as one of the plurality of words, and searching the thesaurus for a related word of the one of the plurality of words. The property searching means can further search the property dictionary for the property of the related word of the property of the target word. The property determining means can further determine whether the property of the related word of the property of the target word matches any of the different words or any of properties of the different words.

The information processing apparatus can further include thesaurus storage means for storing a thesaurus that contains related words of the plurality of words and related-word searching means for considering a property of the target word, as one of the plurality of words, and searching the thesaurus for a related word of the one of the plurality of words. The property searching means can further search the property dictionary for a property of the related word found by the related-word searching means. The related-word searching means can further consider the property of the related word found by the property searching means as one of the plurality of words and searches the thesaurus for a related word of the one of the plurality of words as a related word of the found property. The search operation performed by the property searching means and the search operation performed by the related-word searching means can be performed alternately and repeatedly. The property determining means can further determine whether the related word or the property obtained through the alternate and repeated search operations matches any of the different words or any of properties of the different words.

The information processing apparatus can further include thesaurus storage means for storing a thesaurus that contains related words that are related to the plurality of words, related-word searching means for considering a related word of the target word, as a target-word related word, and searching the thesaurus for the target-word related word, where the related-word searching means further considers a related word of the different word, as a different-word related word, and searches the thesaurus for the different-word related word, and related-word determining means for determining whether the target-word related word matches the different-word related word. The property searching means can further search the property dictionary for the property of the target-word related word that is determined to match the different-word related word, and the property determining means can further determine whether the property of the target word matches the property of the target-word related word.

The property searching means can further search the property dictionary for the properties of genre of the content, and the property determining means can further determine whether the property of the target word matches the genre or the property of the genre.

The information processing apparatus can further include computing means for computing a score of the property of the target word on the basis of a match count between the properties of the target word and the different words or the properties of the different words determined by the property determining means. The determination means can determine the representative property of the target word of the content on the basis of the score.

According to another embodiment of the present invention, a method for processing information includes the steps of extracting a plurality of words serving as keywords of content from content information that describes the content, searching a property dictionary containing the properties of the plurality of words for the properties of the plurality of words, determining whether each of the properties of a target word to be processed and selected from among the words serving as keywords matches any of the different words other than the target word among the words serving as keywords or determining whether each of the properties of a target word matches any of the properties of the different words, and determining a representative property of the target word of the content on the basis of a match count between the properties of the target word and the different words or the properties of the different words determined by the property determining means.

According to still another embodiment of the present invention, a computer-readable program includes program code for causing a computer to execute the processing steps of extracting a plurality of words serving as keywords of content from content information that describes the content, searching a property dictionary containing the properties of the plurality of words for the properties of the plurality of words, determining whether each of the properties of a target word to be processed and selected from among the words serving as keywords matches any of the different words other than the target word among the words serving as keywords or determining whether each of the properties of a target word matches any of the properties of the different words, and determining a representative property of the target word of the content on the basis of a match count between the properties of the target word and the different words or the properties of the different words determined by the property determining means.

According to the embodiments of the present invention, a plurality of words serving as keywords of content are extracted from content information that describes the content. The properties of the plurality of words serving as the keywords are searched for in a property dictionary containing the properties of the words. Subsequently, it is determined whether each of the properties of a target word to be processed and selected from among the words serving as keywords matches any of the different words other than the target word among the words serving as keywords or determining whether each of the properties of a target word matches any of the properties of the different words. A representative property of the target word of the content is determined on the basis of a match count between the properties of the target word and the different words or the properties of the different words determined.

As described above, according to the embodiments of the present invention, one of the properties of a keyword associated with content can be selected so that the selected property is optimal for the content.

BRIEF DESCRIPTION OF THE DRAWINGS

FIG. 4 illustrates an example of a property dictionary;

FIG. 9 illustrates an example of a thesaurus;

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiment are described in the claims. That is, the description does not deny the existence of aspects of the present invention that are described in the embodiment but not claimed in the invention of this application, i.e., the existence of aspects of the present invention that in future may be claimed by a divisional application, or that may be additionally claimed through amendments.

Figure 3:
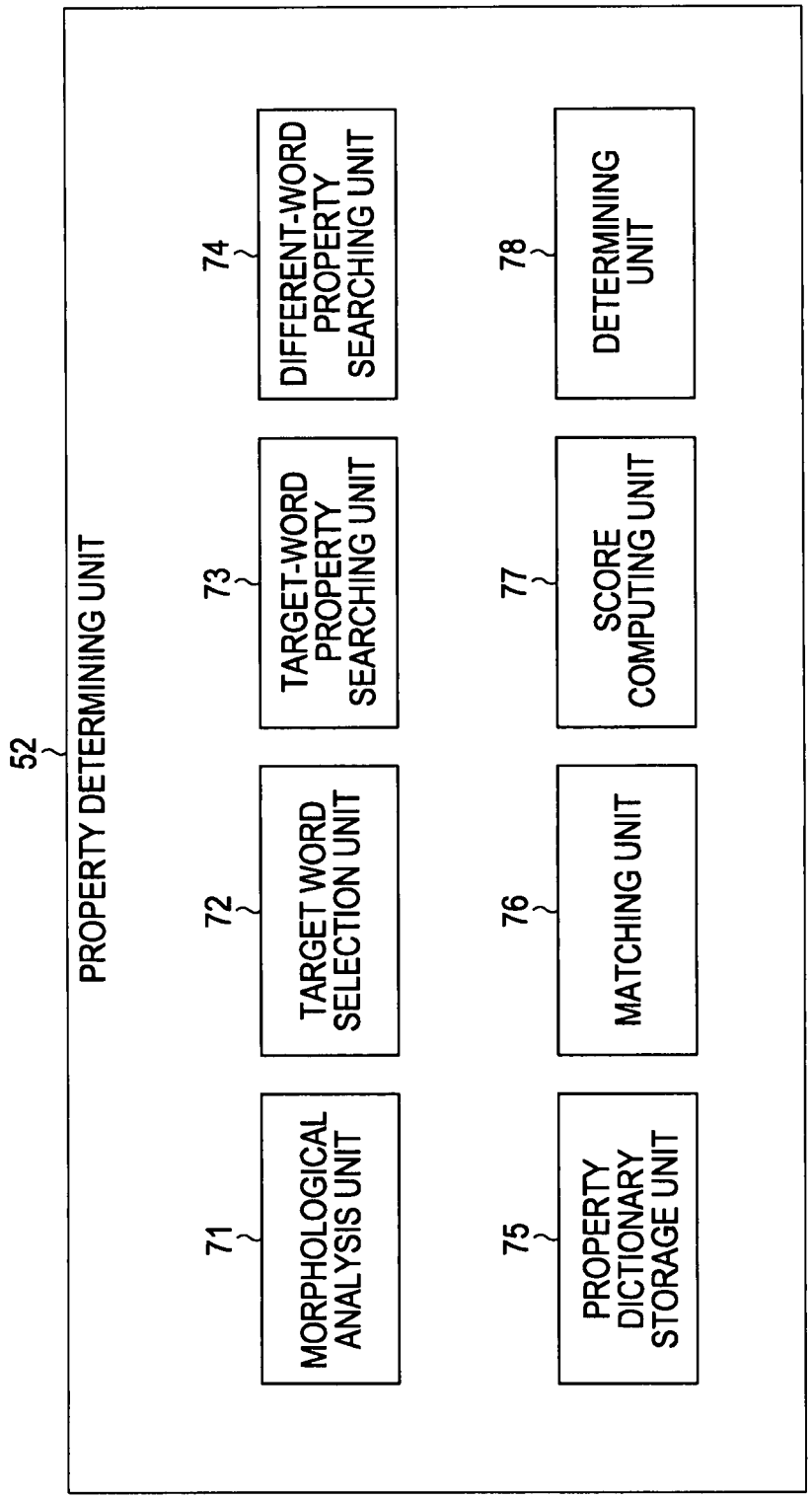
FIG. 3 is a block diagram illustrating an exemplary configuration of a property determining unit in detail.

According to an embodiment of the present invention, an information processing apparatus includes extracting means (e.g., a morphological analysis unit 71 shown in FIG. 3) for extracting a plurality of words serving as keywords of content from content information that describes the content, property dictionary storage means (e.g., a property dictionary storage unit 75 shown in FIG. 3) for storing a property dictionary containing the properties of the words, property searching means (e.g., a target-word property searching unit 73 and a different-word property searching unit 74 shown in FIG. 3) for searching the property dictionary for the properties of the plurality of words serving as keywords, property determining means (e.g., a matching unit 76 shown in FIG. 3) for determining whether each of the properties of a target word to be processed and selected from among the words serving as keywords matches any of the different words other than the target word among the words serving as keywords or determining whether each of the properties of a target word matches any of the properties of the different words, and determination means (e.g., a determining unit 78 shown in FIG. 3) for determining a representative property of the target word of the content on the basis of a match count between the properties of the target word and the different words or the properties of the different words determined by the property determining means.

The information processing apparatus can further include thesaurus storage means (e.g., a thesaurus storage unit 93 shown in FIG. 11) for storing a thesaurus that contains related words of the plurality of words and related-word searching means (e.g., a property thesaurus searching unit 112 shown in FIG. 11) for considering a property of the target word, as one of the plurality of words, and searching the thesaurus for a related word of the one of the plurality of words. The property determining means can further determine whether the related word of the property of the target word matches any of the different words or any of the properties of the different words.

The information processing apparatus can further include thesaurus storage means (e.g., a thesaurus storage unit 93 shown in FIG. 13) for storing a thesaurus that contains related words of the plurality of words and related-word searching means (e.g., a property thesaurus searching unit 112 shown in FIG. 13) for considering a property of the target word, as one of the plurality of words, and searching the thesaurus for a related word of the one of the plurality of words. The property searching means can further search the property dictionary for the property of the related word of the property of the target word. The property determining means can further determine whether the property of the related word of the property of the target word matches any of the different words or any of properties of the different words.

The information processing apparatus can further include thesaurus storage means (e.g., a thesaurus storage unit 93 shown in FIG. 13) for storing a thesaurus that contains related words of the plurality of words and related-word searching means (e.g., a property thesaurus searching unit 112 shown in FIG. 13) for considering a property of the target word, as one of the plurality of words, and searching the thesaurus for a related word of the one of the plurality of words. The property searching means can further search the property dictionary for a property of the related word found by the related-word searching means. The related-word searching means can further consider the property of the related word found by the property searching means as one of the plurality of words and searches the thesaurus for a related word of the one of the plurality of words as a related word of the found property. The search operation performed by the property searching means and the search operation performed by the related-word searching means can be performed alternately and repeatedly. The property determining means can further determine whether the related word or the property obtained through the alternate and repeated search operations matches any of the different words or any of properties of the different words.

Figure 8:
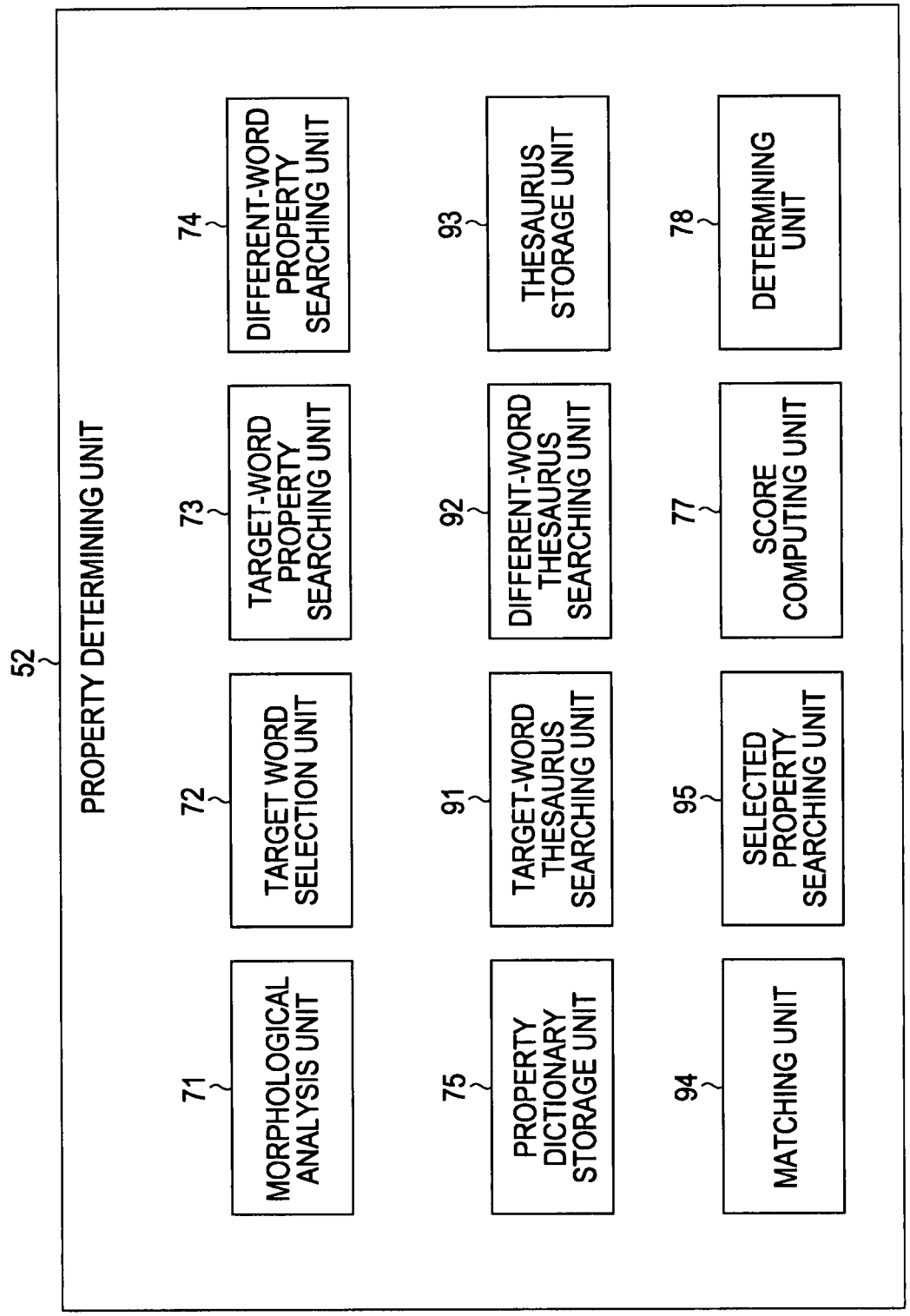
FIG. 8 is a block diagram illustrating another example of the configuration of the property determining unit in detail.

The information processing apparatus can further include thesaurus storage means (e.g., a thesaurus storage unit 93 shown in FIG. 8) for storing a thesaurus that contains related words that are related to the plurality of words, related-word searching means (e.g., a target-word thesaurus searching unit 91 and a different-word thesaurus searching unit 92 shown in FIG. 8) for considering a related word of the target word, as a target-word related word, and searching the thesaurus for the target-word related word, where the related-word searching means further considers a related word of the different word, as a different-word related word, and searches the thesaurus for the different-word related word, and related-word determining means (e.g., a matching unit 76 shown in FIG. 8) for determining whether the target-word related word matches the different-word related word. The property searching means can further search the property dictionary for the property of the target-word related word that is determined to match the different-word related word, and the property determining means can further determine whether the property of the target word matches the property of the target-word related word.

The information processing apparatus can further include computing means (e.g., a score computing unit 77 shown in FIG. 3) for computing a score of the property of the target word on the basis of a match count between the properties of the target word and the different words or the properties of the different words determined by the property determining means. The determination means can determine the representative property of the target word of the content on the basis of the score.

Figure 6:
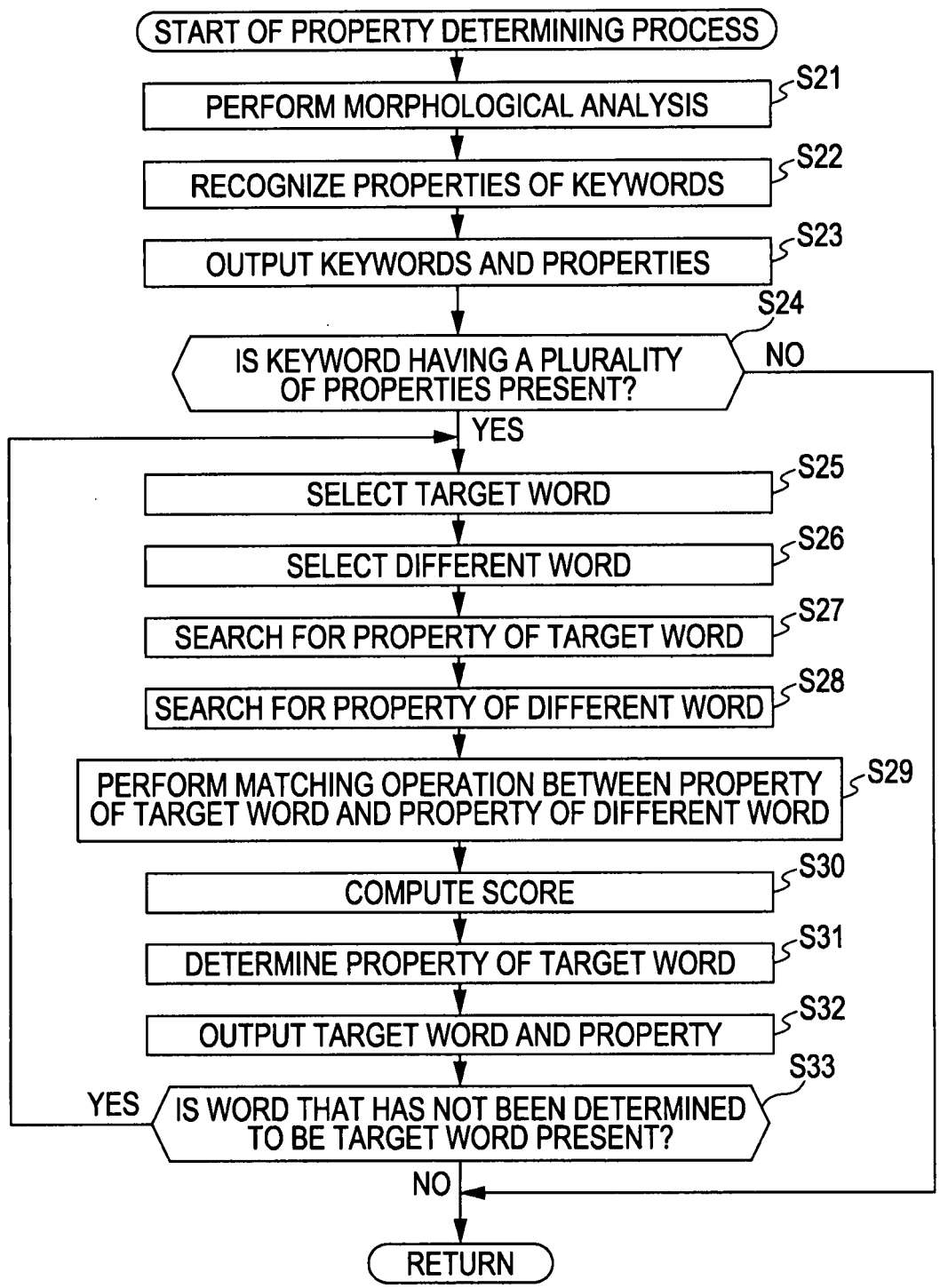
FIG. 6 is a flow chart illustrating a property determining process.

According to another embodiment of the present invention, a method for processing information or a computer-readable program includes the steps of extracting a plurality of words serving as keywords of content from content information that describes the content (e.g., step S21 shown in FIG. 6), searching a property dictionary containing the properties of the plurality of words for the properties of the plurality of words (e.g., steps S27 and S28 shown in FIG. 6), determining whether each of the properties of a target word to be processed and selected from among the words serving as keywords matches any of the different words other than the target word among the words serving as keywords or determining whether each of the properties of a target word matches any of the properties of the different words (e.g., step S29 shown in FIG. 6), and determining a representative property of the target word of the content on the basis of a match count between the properties of the target word and the different words or the properties of the different words determined by the property determining means (e.g., step S31 shown in FIG. 6).

Exemplary embodiments of the present invention are described in detail with reference to the accompanying drawings.

Figure 1:
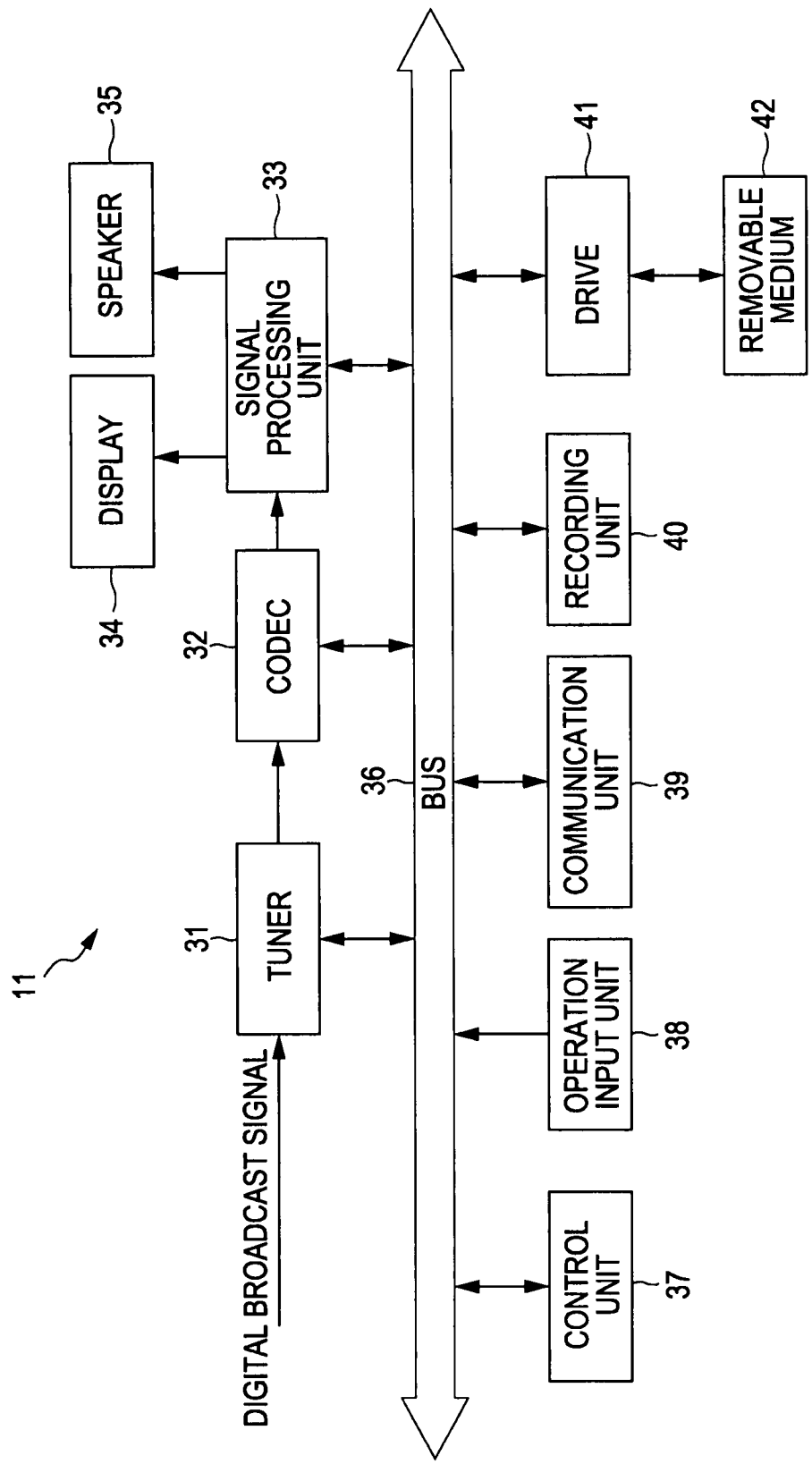
FIG. 1 is a block diagram of a television receiver according to an embodiment of the present invention.

FIG. 1 is a block diagram of a television receiver 11 according to an exemplary embodiment of the present invention.

As shown in FIG. 1, the television receiver 11 includes a tuner 31, a coder/decoder (CODEC) 32, a signal processing unit 33, a display 34, a speaker 35, a control unit 37, an operation input unit 38, a communication unit 39, a recording unit 40, and a drive 41, all of which are connected to each other via a bus 36. The television receiver 11 receives radio waves including a digital signal of a program (an image and sound) and outputs the image and sound of the program.

The tuner 31 receives a digital broadcast signal in the form of radio waves transmitted from a broadcast station (not shown). The digital broadcast signal contains a digital signal of a program and a digital signal of program-related information. The program-related information includes program listings, annotation text of a program including the title thereof (hereinafter referred to as "content information"), and a genre of the program. An example of the program-related information is an electronic program guide (EPG). Subsequently, the tuner 31 demodulates the received digital broadcast signal.

Under the control of the control unit 37, the tuner 31 supplies the image data and audio data of the demodulated program (hereinafter collectively referred to as "program data") to the CODEC 32 or the recording unit 40 via the bus 36. In addition, the tuner 31 supplies the demodulated program-related information to the control unit 37 via the bus 36.

The CODEC 32 decodes the program data (the encoded program data) supplied from the recording unit 40 via the bus 36 using a predetermined method, such as MPEG-2 (Moving Picture Experts Group phase 2). Subsequently, the CODEC 32 supplies the decoded program data to the signal processing unit 33.

The signal processing unit 33 performs predetermined processes on the program data supplied from the CODEC 32. Examples of the predetermined processes include a data conversion process of converting the program data to a composite signal and a digital-to-analog (D/A) conversion process. Subsequently, the signal processing unit 33 supplies the image data of the program data to the display 34 and supplies the audio data of the program data to the speaker 35.

In addition, the signal processing unit 33 performs, for example, the data conversion process and the D/A conversion process on the image data supplied from the control unit 37 for displaying a variety of screens. The signal processing unit 33 then supplies the processed image data to the display 34.

The display 34 displays an image corresponding to the image data supplied from the signal processing unit 33. The speaker 35 outputs sound corresponding to the audio data supplied from the signal processing unit 33.

The control unit 37 is composed of, for example, an embedded microcomputer including a central processing unit (CPU), a read only memory (ROM), and a random access memory (RAM). The control unit 37 performs a variety of processing in accordance with an operation signal corresponding to a user operation input from the operation input unit 38.

For example, the control unit 37 retrieves a keyword for each of the programs from the program-related information supplied from the tuner 31 or the communication unit 39. Thereafter, the control unit 37 stores the keyword for a program together with the properties of the keyword. In addition, the control unit 37 searches for a program relating to a displayed program, which is currently displayed on the display 34.

In addition, the control unit 37 controls the tuner 31 so as to provide the program data obtained through the demodulation to the recording unit 40 via the bus 36. Thus, the program data is recorded. Furthermore, the control unit 37 reads out the program data from the recording unit 40 and supplies the program data to the CODEC 32 via the bus 36. Still furthermore, the control unit 37 generates image data for displaying a variety of screens and supplies the generated image data to the signal processing unit 33 via the bus 36.

The control unit 37 performs the variety of processing by executing a computer program installed in, for example, the recording unit 40. In addition, the control unit 37 installs, in the recording unit 40, a computer program downloaded by the communication unit 39 or a computer program recorded on a removable medium 42 mounted on the drive 41 as needed. Examples of the removable medium 42 include a magnetic disk, an optical disk, a magnetooptical disk, and a semiconductor memory.

For example, but not limited to, the operation input unit 38 includes a reception section for receiving an instruction transmitted from a remote controller (not shown), a button, a keyboard, a mouse, and a switch. The operation input unit 38 supplies an operation signal representing a user operation to the control unit 37 via the bus 36.

The communication unit 39 transmits and receives a variety of data via a network, such as the Internet (not shown). For example, the communication unit 39 receives program-related information via the network from a server (not shown) and supplies that information to the control unit 37 via the bus 36. In addition, the communication unit 39 downloads a predetermined program from, for example, a server (not shown) via the network.

The recording unit 40 stores program data supplied from the control unit 37 via the bus 36. In addition, the recording unit 40 stores a computer program executed by the CPU of the control unit 37 and a variety of data as needed. Furthermore, under the control of the control unit 37, the recording unit 40 reads out the stored program data and supplies the readout program data to the CODEC 32.

The removable medium 42 is mounted on the drive 41 as needed. The drive 41 drives the removable medium 42 so as to read out the program and the data stored on the removable medium 42. Subsequently, the drive 41 supplies the readout program and data to the recording unit 40 via the bus 36.

Subsequently, by executing a predetermined computer program, the control unit 37 functions as a program search unit for searching for a program related to a program currently displayed.

Figure 2:
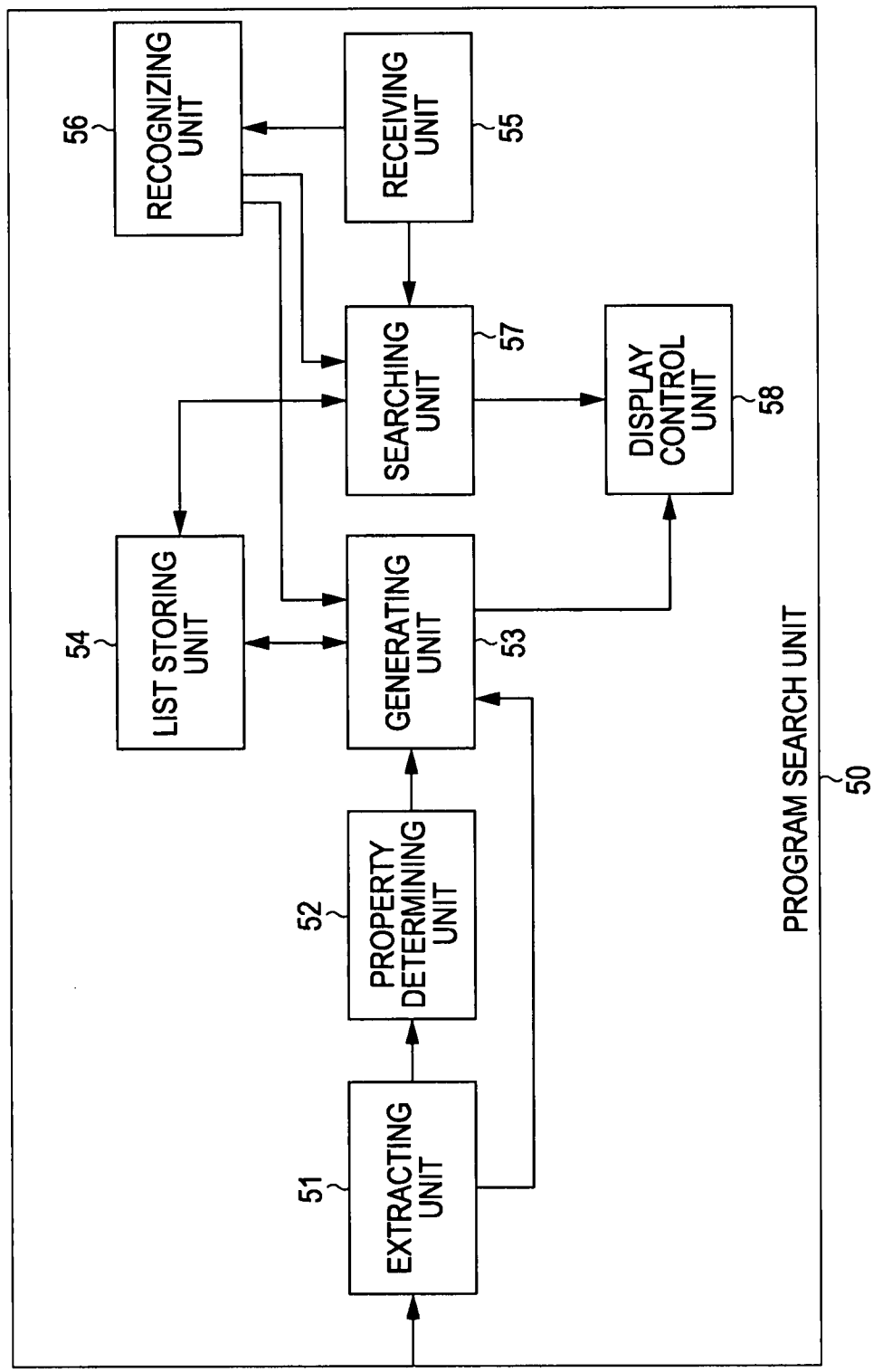
FIG. 2 is a block diagram illustrating an exemplary configuration of a program search unit.

FIG. 2 illustrates an exemplary configuration of such a program search unit.

As shown in FIG. 2, a program search unit 50 includes an extracting unit 51, a property determining unit 52, a generating unit 53, a list storing unit 54, a receiving unit 55, a recognizing unit 56, a searching unit 57, and a display control unit 58.

The extracting unit 51 extracts content information from the program-related information supplied from the tuner 31. Thereafter, the extracting unit 51 supplies the content information to the property determining unit 52 and supplies the title contained in the content information to the generating unit 53. The extracting unit 51 extracts the genre (classification) of the program from the program-related information as needed. The extracting unit 51 supplies the genre to the property determining unit 52.

The property determining unit 52 extracts a keyword from the content information supplied from the extracting unit 51. The property determining unit 52 then performs a property determining process for determining the property of the keyword using the content information. When the genre is supplied from the extracting unit 51, the property determining unit 52 extracts a genre word having, for example, the word type noun from the genre. Subsequently, the property determining unit 52 performs the property determining process using the genre word in addition to the content information. As used herein, the term "word" does not necessarily refer to one word, but may refer to a phrase.

The property determining unit 52 associates the property determined through the property determining process with the corresponding keyword. The property determining unit 52 then supplies the property and the keyword to the generating unit 53. The property determining unit 52 is described in detail below with reference to FIG. 3 and the subsequent drawings.

The generating unit 53 generates a list that contains the property and the corresponding keyword supplied from the property determining unit 52 for each title supplied from the extracting unit 51. Thereafter, the generating unit 53 supplies the generated list to the list storing unit 54. In addition, on the basis of the title of a currently displayed program supplied from the recognizing unit 56, which is described below, the generating unit 53 reads out a list corresponding to the title from the list storing unit 54. Subsequently, the generating unit 53 supplies the keyword registered with the list to the display control unit 58. The list storing unit 54 stores a list supplied from the generating unit 53.

The receiving unit 55 receives an operation signal related to a program search operation among operation signals supplied from the operation input unit 38. The receiving unit 55 then supplies the operation signal to the recognizing unit 56 or the searching unit 57. For example, the receiving unit 55 receives an operation signal of an operation for displaying the keywords of a displayed program and supplies the operation signal to the recognizing unit 56. In addition, the receiving unit 55 receives an operation signal of an operation for selecting a desired keyword from among the keywords of the displayed program and supplies the operation signal to the searching unit 57.

In response to an operation signal supplied from the receiving unit 55, the recognizing unit 56 recognizes the title of the displayed program. For example, the recognizing unit 56 recognizes the title of the currently displayed program on the basis of the channel of a program instructed to be displayed most recently, the current date and time, and a program list included in the program-related information. The recognizing unit 56 supplies the recognized title to the generating unit 53 and the searching unit 57.

In response to an operation signal supplied from the receiving unit 55, the searching unit 57 reads out, from the list storing unit 54, a property corresponding to a keyword selected by a user and registered with the list corresponding to the title of a displayed program supplied from the recognizing unit 56. Thereafter, the searching unit 57 searches the list storing unit 54 for the property and the title corresponding to the list registered in association with the keyword selected by the user as the title of a related program. The searching unit 57 then supplies the title to the display control unit 58.

In this way, the searching unit 57 searches for the title of a related program on the basis of not only the keyword of the currently displayed program but also the property of the keyword. Accordingly, the searching unit 57 can further reliably search for the title of a related program.

The display control unit 58 generates image data for displaying a screen in which keywords supplied from the generating unit 53 are listed. The display control unit 58 then supplies the generated image data to the signal processing unit 33. As a result, a screen in which keywords of the currently displayed program are listed is displayed on the display 34. The user views that screen and operates the operation input unit 38 so as to select a desired keyword from among the keywords listed in the screen.

In addition, the display control unit 58 generates image data for a screen to display a list of titles supplied from the searching unit 57. Thereafter, the display control unit 58 supplies the generated image data to the signal processing unit 33. As a result, a screen in which the list of titles of the related programs is shown is displayed on the display 34.

The user views the screen and operates the operation input unit 38 so as to select the title of a desired program. Subsequently, the user performs operations for instructing displaying at a preset time, recording at a preset time, or immediate displaying of the program having the selected title. In this way, the user can achieve displaying at a preset time, recording at a preset time, or immediate displaying of the related program.

FIG. 3 is a block diagram illustrating an exemplary configuration of the property determining unit 52 shown in FIG. 2 in detail.

As shown in FIG. 3, the property determining unit 52 includes a morphological analysis unit 71, a target word selection unit 72, a target-word property searching unit 73, a different-word property searching unit 74, a property dictionary storage unit 75, a matching unit 76, a score computing unit 77, and a determining unit 78. The property determining unit 52 determines the property of a given keyword on the basis of the properties of keywords other than the given keyword contained in the content information.

The morphological analysis unit 71 performs a morphological analysis on the content information supplied from the extracting unit 51. Thus, the content information is separated into words. A word type of each of the words is identified. The morphological analysis unit 71 extracts the words tagged with the word type "noun" as keywords and supplies the extracted keywords to the target word selection unit 72.

The target word selection unit 72 recognizes the properties of the keywords supplied from the morphological analysis unit 71 on the basis of the property dictionary stored in the property dictionary storage unit 75, which is described below. The target word selection unit 72 sequentially selects a word having a plurality of properties as a target word to be processed from among the keywords supplied from the morphological analysis unit 71.

In addition, the target word selection unit 72 selects words other than the selected words as different words from among the keywords supplied from the morphological analysis unit 71. Furthermore, the target word selection unit 72 associates the keyword having only one property among the keywords supplied from the morphological analysis unit 71 with that property, and supplies the keyword and the property to the generating unit 53 shown in FIG. 2.

The target-word property searching unit 73 searches the property dictionary stored in the property dictionary storage unit 75 for the property of the target word supplied from the target word selection unit 72. The target-word property searching unit 73 then supplies the found property of the target word to the matching unit 76.

The different-word property searching unit 74 searches the property dictionary stored in the property dictionary storage unit 75 for the property of the different word supplied from the target word selection unit 72 as the property of the different word. The different-word property searching unit 74 then supplies the found property of the different word to the matching unit 76. The property dictionary storage unit 75 stores the property dictionary.

The matching unit 76 determines whether the property of the target word supplied from the target-word property searching unit 73 matches the property of the different word supplied from the different-word property searching unit 74. That is, the matching unit 76 performs a matching operation between the property of a target word and the property of a different word. The matching unit 76 supplies each of the properties of the target word and the match count between the property of the target word and the properties of the different word to the score computing unit 77 in accordance with the result of the matching operation.

The score computing unit 77 computes a score of each of the properties of the target word supplied from the matching unit 76 on the basis of the match count supplied from the matching unit 76 and a predetermined weight coefficient. For example, the score computing unit 77 computes a value by multiplying the match count by the predetermined weight coefficient as a score. In the present embodiment, a property having a greater value is determined to be a higher-score property.

In the example shown in FIG. 3, the value of the weight coefficient varies in accordance with the position of the different word in the content information. Hereinafter, the weight coefficient is referred to as a "position coefficient". For example, the position coefficient is determined such that the value of the position coefficient is greater in the case where the different word to be matched is contained in the information other than the title than in the case where the different word is contained in the title.

The score computing unit 77 supplies each of the properties of the target word and the score of the property to the determining unit 78. The determining unit 78 determines the property having the highest score to be the property of the target word of the program on the basis of the properties and the scores supplied from the score computing unit 77. Thereafter, the determining unit 78 associates the target word serving as a keyword with the determined property, and supplies the target word and the property to the generating unit 53.

FIG. 4 illustrates an example of the property dictionary stored in the property dictionary storage unit 75 shown in FIG. 3.

As shown in FIG. 4, the first row of the table is a title row containing fields "word" and "property". In the rows subsequent to the second row, the items of the each field are written. The field "word" contains a word. The field "property" contains the corresponding property or properties of the word.

For example, in the second row, the field "word" contains "cattle". The field "property" contains "animal, food". That is, the second row indicates that the properties of the word "cattle" are "animal" and "food".

Similarly, in the rows subsequent to the third row, the fields "word" contain "barbecue", "meat", "food", "variety program", "World Cup", "goal", "Diet", "Lower House", "Upper House", and so on. The fields "property" contain the corresponding properties "animal, food", "food", "food", "food", "program genre", "sports event (soccer), sports event (volleyball)", "sports term (soccer), sports term (athletics)", "organization, architecture", "organization", "organization", and so on.

That is, the rows subsequent to the third row indicate the followings: the property of the word "barbecue" is "food", the property of the word "meat" is "food", the property of the word "foodstuff" is "food", the property of the word "variety program" is "program genre", the properties of the word "World Cup" are "sports event (soccer)" and "sports event (volleyball)", the properties of the word "goal" are "sports term (soccer)" and "sports term (athletics)", the properties of the word "Diet" are "organization" and "architecture", the property of the word "Lower House" is "organization", and the property of the word "Upper House" is "organization", etc.

Note that each of the pieces of information in the parenthesis in the property represents a more detailed property. For example, the property "sports event (soccer)" includes a more detailed sub-property "soccer" of the property "sports event".

A list generating process performed by the program search unit 50 shown in FIG. 2 is described next with reference to FIG. 5. This list generating process is started when, for example, the program-related information is supplied from the tuner 31.

At step S1, the extracting unit 51 extracts the content information from the program-related information supplied from the tuner 31. Thereafter, the extracting unit 51 supplies the content information to the property determining unit 52 and supplies the title contained in the content information to the generating unit 53. At that time, the extracting unit 51 extracts the genre of the program from the program-related information and supplies the genre to the property determining unit 52 as needed.

After the process at step S1 is completed, the process proceeds to step S2. At step S2, the property determining unit 52 extracts a keyword from the content information supplied from the extracting unit 51. Subsequently, the property determining unit 52 performs a property determining process so as to determine the property of the keyword using the content information. If the genre information is supplied from the extracting unit 51, the property determining unit 52 extracts a genre word from the genre information and performs the property determining process using the genre word in addition to the content information. The property determining process is described in more detail below with reference to FIGS. 6, 10, 12, 14, and 15.

After the process at step S2 is completed, the process proceeds to step S3. At step S3, the generating unit 53 generates a list that contains a pair consisting of the property and the corresponding keyword supplied from the property determining unit 52 for each title supplied from the extracting unit 51. Thereafter, the generating unit 53 supplies the generated list to the list storing unit 54. Thus, the list is stored in the list storing unit 54.

Figure 5:
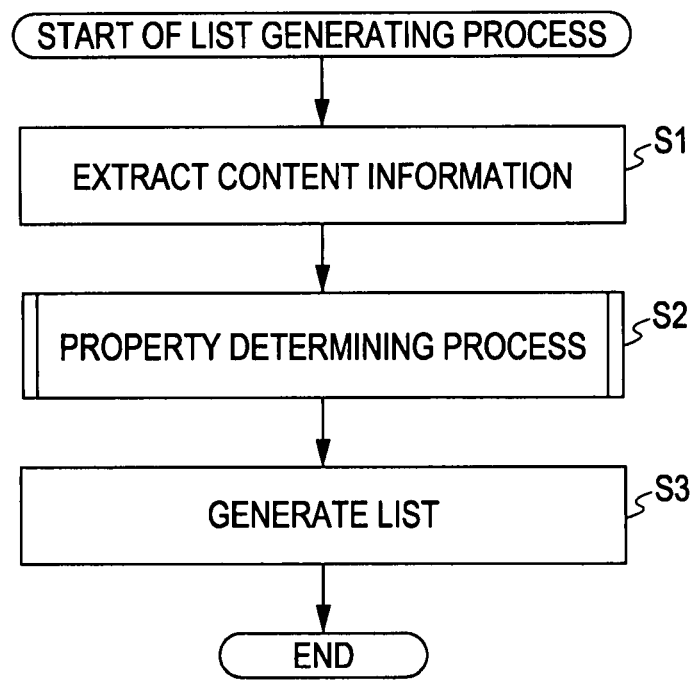
FIG. 5 is a flow chart illustrating a list generating process.

The property determining process performed by the property determining unit 52 shown in FIG. 3 at step S2 of FIG. 5 is described in detail next with reference to FIG. 6.

At step S21, the morphological analysis unit 71 shown in FIG. 3 performs morphological analysis on the content information supplied from the extracting unit 51. Thereafter, the morphological analysis unit 71 extracts the words tagged with the word type "noun" as keywords and supplies the extracted keywords to the target word selection unit 72.

For example, assume that the content information that indicates what is contained in a program includes the text "The World Cup Match Japan vs. Brazil is shown here. Don't miss Nakada's game-winning goal!" In this case, the morphological analysis unit 71 extracts the words tagged with the word type "noun": "World Cup", "Match", "Japan", "Brazil", "Nakada", and "goal" as keywords.

After the process at step S21 is completed, the process proceeds to step S22. At step S22, the target word selection unit 72 recognizes the properties of the keywords supplied from the morphological analysis unit 71 on the basis of the property dictionary stored in the property dictionary storage unit 75.

After the process at step S22 is completed, the process proceeds to step S23. At step S23, the target word selection unit 72 associates each of the keywords having only one property with that property, and supplies the keyword and the property to the generating unit 53. Thereafter, the process proceeds to step S24.

At step S24, the target word selection unit 72 determines whether a keyword having a plurality of properties is present among the keywords. If the target word selection unit 72 determines that no keywords having a plurality of properties are present, the process returns to step S2 of FIG. 5. The process then proceeds to step S3.

However, if the target word selection unit 72 determines that a keyword having a plurality of properties is present, the process proceeds to step S25. At step S25, the target word selection unit 72 selects, as a target word, one of the words that have not yet been determined to be target words from among the keywords each having a plurality of properties. The target word selection unit 72 then supplies the selected word to the target-word property searching unit 73.

After the process at step S25 is completed, the process proceeds to step S26. At step S26, the target word selection unit 72 selects, from among the keywords, words other than the selected words as different words. Thereafter, the target word selection unit 72 supplies the different words to the different-word property searching unit 74. For example, the target word selection unit 72 selects the keyword "World Cup" having two properties "sports event (soccer)" and "sports event (volleyball)" as a target word. In addition, the target word selection unit 72 selects keywords other than the target word "World Cup" as the different words.

After the process at step S26 is completed, the process proceeds to step S27. At step S27, the target-word property searching unit 73 searches the property dictionary stored in the property dictionary storage unit 75 for the property of the target word supplied from the target word selection unit 72 and determines the found one to be the property of the target word. The target-word property searching unit 73 then supplies the property of the target word to the matching unit 76.

After the process at step S27 is completed, the process proceeds to step S28. At step S28, the different-word property searching unit 74 searches the property dictionary stored in the property dictionary storage unit 75 for the property of the different word supplied from the target word selection unit 72 and determines the found one to be the property of the different word. The different-word property searching unit 74 then supplies the property of the different word to the matching unit 76.

After the process at step S28 is completed, the process proceeds to step S29. At step S29, the matching unit 76 performs a matching operation between the property of the target word supplied from the target-word property searching unit 73 and the property of the different word supplied from the different-word property searching unit 74. Subsequently, the matching unit 76 supplies each of the properties of the target word and the match count between the property of the target word and the properties of the different words to the score computing unit 77 in accordance with the result of the matching operation.

For example, the matching unit 76 performs a matching operation between each of the properties "sports event (soccer)" and "sports event (volleyball)" of the target word "World Cup" and each of the properties "sports term (soccer)" and "sports term (volleyball)" of the different word "goal". As a result, the property "sports event (soccer)" of the target word "World Cup" is determined to match the property "sports term (soccer)" of the different word "goal" in relation to the word "soccer". Therefore, the matching unit 76 supplies the property "sports event (soccer)" of the target word "World Cup" to the score computing unit 77 together with the match count of "1", which is the match count of this property, in accordance with the result of the matching operation.

In addition, the matching unit 76 determines whether each of the properties "sports term (soccer)" and "sports term (athletics)" of the target word "goal" matches each of the properties "sports event (soccer)" and "sports event (volleyball)" of the different word "World Cup". As a result, the property "sports term (soccer)" of the target word "goal" matches the property "sports event (soccer)" of the different word "World Cup" in terms of the word "soccer". Therefore, the matching unit 76 supplies the property "sports term (soccer)" of the target word "goal" to the score computing unit 77 together with the match count of "1", which is the match count of this property, in accordance with the result of the matching operation.

After the process at step S29 is completed, the process proceeds to step S30. At step S30, the score computing unit 77 computes a score of each of the properties of the target word supplied from the matching unit 76 on the basis of the match count supplied from the matching unit 76 and a predetermined weight coefficient. Subsequently, the score computing unit 77 supplies each of the properties of the target word and the score of the property to the determining unit 78.

After the process at step S30 is completed, the process proceeds to step S31. At step S31, the determining unit 78 determines the property having the highest score to be the property of the target word of the program on the basis of the properties and the scores supplied from the score computing unit 77.

For example, the determining unit 78 determines the property "sports event (soccer)" having the highest score to be the property of the target word "World Cup" on the basis of the score. In addition, the determining unit 78 determines the property "sports term (soccer)" having the highest score to be the property of the target word "goal" on the basis of the score.

After the process at step S31 is completed, the process proceeds to step S32. At step S32, the determining unit 78 associates the target word serving as a keyword with the determined property, and supplies the target word and the property to the generating unit 53. Thereafter, the process proceeds to step S33.

At step S33, the target word selection unit 72 determines whether a word that has not yet been selected as a target word from among the words each having a plurality of properties is present. If the target word selection unit 72 determines whether that a word that has not yet been selected as a target word is present, the process returns to step S25. Thereafter, the above-described processes are repeated.

However, if the target word selection unit 72 determines that no word that have not yet been selected as target words are present, that is, if all of the words of keywords each having a plurality of properties have been selected as target words, the process returns to step S2 of FIG. 5. The process then proceeds to step S3.

In this way, when a word serving as a keyword has a plurality of properties, the property determining unit 52 shown in FIG. 3 determines the property of the keyword on the basis of the match count between the property of the keyword and the property of a different word contained in the content information. Accordingly, the property determining unit 52 can select the property optimum for the program content from among a plurality of the properties of the keyword and determine the selected property to be the property of the keyword.

For example, when the content information contains the text "The World Cup Match Japan vs. Brazil is shown here. Don't miss Nakada's game-winning goal!", the property determining unit 52 can choose the property "sports event (soccer)" as the property of the keyword "World Cup" of the program related to the soccer World Cup, not the property "sports event (volleyball)". As a result, the program search unit 50 shown in FIG. 2 can search for the title of a program related to the soccer World Cup as the title of a related-program on the basis of the keyword "World Cup" and the keyword "sports event (soccer)".

A program searching process performed by the program search unit 50 shown in FIG. 2 that searches for a related program is described next with reference to FIG. 7. This program searching process is started when, for example, the receiving unit 55 receives an operation signal of the user operation for displaying the keyword of the currently displayed program.

At step S41, upon receipt of the operation signal of the user operation for displaying the keyword of the displayed program, the recognizing unit 56 recognizes the title of the currently displayed program and supplies the recognized title to the generating unit 53 and the searching unit 57.

After the process at step S41 is completed, the process proceeds to step S42. At step S42, upon receipt of the title of the currently displayed program supplied from the recognizing unit 56, the generating unit 53 reads out the list corresponding to the title. Subsequently, the generating unit 53 supplies keywords listed in the list.

After the process at step S42 is completed, the process proceeds to step S43. At step S43, the display control unit 58 generates image data for displaying a screen in which the keywords supplied from the generating unit 53 are listed. Thereafter, the display control unit 58 supplies the image data to the signal processing unit 33. Thus, the screen in which the keywords of the displayed program are listed is displayed on the display 34. The user views the screen displayed on the display 34 and operates the operation input unit 38 so as to select a desired keyword from among the keywords of the currently displayed program.

After the process at step S43 is completed, the process proceeds to step S44. At step S44, the receiving unit 55 determines whether the user has selected a keyword, that is, whether it receives an operation signal of an operation for selecting a desired keyword from among the keywords of the currently displayed program. If the receiving unit 55 determines that a keyword has not been selected, the receiving unit 55 waits for a keyword to be selected.

However, the receiving unit 55, at step S44, determines whether the user has selected a keyword, the receiving unit 55 supplies an operation signal of an operation for selecting a desired keyword from among the keywords of the displayed program to the searching unit 57. Subsequently, the process proceeds to step S45.

At step S45, upon receipt of the operation signal from the receiving unit 55, the searching unit 57 reads out the property of the keyword selected by the user from the list stored in the storing unit 54, the list corresponding to the title of the currently displayed program supplied from the recognizing unit 56.

At step S46, on the basis of the property read out at step S45 and the keyword selected by the user, the searching unit 57 searches the list storing unit 54 for a title corresponding to a list containing the property and the keyword which are associated with each other as the title of a related program. The searching unit 57 supplies the found title to the display control unit 58.

After the process at step S46 is completed, the process proceeds to step S47. At step S47, the display control unit 58 generates image data for displaying a screen in which the titles supplied from the searching unit 57 are listed, and supplies the image data to the signal processing unit 33. Thus, the screen in which the titles of related programs are listed is displayed on the display 34. Subsequently, the process is completed.

FIG. 8 is a block diagram illustrating another example of the configuration of the property determining unit 52 shown in FIG. 2 in detail.

As shown in FIG. 8, the property determining unit 52 includes the morphological analysis unit 71, the target word selection unit 72, the target-word property searching unit 73, the different-word property searching unit 74, the property dictionary storage unit 75, the score computing unit 77, the determining unit 78, a target-word thesaurus searching unit 91, a different-word thesaurus searching unit 92, a thesaurus storage unit 93, a matching unit 94, and a selected property searching unit 95. The property determining unit 52 determines the property of a keyword on the basis of the property of a keyword other than the keyword stored in the content information and a related word that is related to the keyword. Similar numbering will be used in describing FIG. 8 as was utilized above in describing FIG. 3. Therefore, descriptions are not repeated.

The thesaurus storage unit 93 stores a thesaurus, which is described in more detail below. The thesaurus contains a word and a related word that is related to the word. The target-word thesaurus searching unit 91 searches the thesaurus for a related word of the target word selected by the target word selection unit 72. The target-word thesaurus searching unit 91 supplies a found related word to the matching unit 94. Note that a relationship (e.g., a hypernym, a hyponym, a relevant term, or a synonym) is assigned to a related word.

The different-word thesaurus searching unit 92 searches the thesaurus stored in the thesaurus storage unit 93 for a related word of the different word selected by the target word selection unit 72. The different-word thesaurus searching unit 92 supplies a found related word to the matching unit 94. As described above, the thesaurus storage unit 93 stores the thesaurus.

Like the matching unit 76 shown in FIG. 3, the matching unit 94 performs a matching operation between the property of the target word supplied from the target-word property searching unit 73 and the property of a different word supplied from the different-word property searching unit 74. Subsequently, like the matching unit 76, the matching unit 94 supplies each of the properties of the target word and the match count between the property of the target word and the properties of the different words to the score computing unit 77 in accordance with the result of the matching operation.

In addition, the matching unit 94 performs a matching operation between the related word of the target word supplied from the target-word thesaurus searching unit 91 and the related word of a different word supplied from the different-word thesaurus searching unit 92. Subsequently, in accordance with the result of the matching operation, the matching unit 94 supplies the related word of the target word that is determined to match the related word of the different word to the selected property searching unit 95 as a selected related word.

Furthermore, the matching unit 94 performs a matching operation between the property of the target word found by the target-word property searching unit 73 and the property of the selected related word supplied from the selected property searching unit 95. Subsequently, the matching unit 94 supplies each of the properties of the target word and the match count between the property of the target word and the properties of the selected related words to the score computing unit 77 in accordance with the result of the matching operation.

The selected property searching unit 95 searches the property dictionary stored in the property dictionary storage unit 75 for the property of the selected related word supplied from the matching unit 94 as the property of the selected related word. Subsequently, the selected property searching unit 95 supplies the found property of the selected related word to the matching unit 94.

In an example shown in FIG. 8, a position coefficient or a coefficient (hereinafter referred to as a "positional relationship coefficient") that varies according to the position of a different word in the content information from which the matching target derives and the relationship included in the related word from which the matching target derives is used as a weight coefficient by the score computing unit 77 when the score computing unit 77 computes the score. For example, the positional relationship coefficient is determined so as to be higher in the case where the property of the selected related word derives from the related word having a relationship of a "synonym" than in the case where the property of the selected related word derives from the related word having a relationship of a "hypernym".

In addition, the score computing unit 77 shown in FIG. 8 sums the score computed in accordance with the matching result between the property of the target word and the property of a different word and the score computed in accordance with the matching result between the property of the target word and the property of a selected related word for each of the properties of the target word. The sum is determined to be a final score. The score computing unit 77 supplies the score to the determining unit 78 together with the property.

FIG. 9 illustrates an example of the thesaurus stored in the thesaurus storage unit 93 shown in FIG. 8.

The table shown in FIG. 9 has a title row including fields "word", "related word", and "relationship". From the second row, data corresponding to such fields are listed. The "word" field contains a word. The "related word" field contains a related word of the word in the corresponding "word" field. The "relationship" field contains a relationship between the word in the "word" field and the related word.

For example, in the second row, the "word" field contains "cattle". The "related word" field contains "animal". The "relationship" field contains "hypernym". That is, the second row indicates that the related word of the word "cattle" is an "animal" and the relationship between the related word "animal" and the word "cattle" is a "hypernym". That is, the related word "animal" is a hypernym of the word "cattle".

Similarly, from the third row, the "word" fields sequentially contain "cattle", "barbecue", "barbecue", "foodstuff", "foodstuff", "Diet", "Diet", "Lower House", "Lower House", "Upper House", "Upper House", "animal", "animal", "food", "food", and so on. From the third row, the "related word" fields sequentially contain "meat", "food", "meat", "food", "recipe", "Lower House", "Upper House", "Diet", "Upper House", "Diet", "Lower House", "creature", "living things", "cooking ingredient", "barbecue", and so on. From the third row, the "relationship" fields sequentially contain "relevant term", "hypernym", "relevant term", "synonym", "hypernym", "hyponym", "hyponym", "hypernym", "relevant term", "hypernym", "relevant term", "synonym", "hypernym", "hyponym", "hyponym", and so on.

That is, the rows from the third row indicate the followings. The related word of the word "cattle" is a word "meat", which is a relative term of the word "cattle". The related words of the word "barbecue" are a word "food", which is a hypernym of the word "barbecue", and a word "meat", which is a relevant term of the word "barbecue". The related words of the word "foodstuff" are a word "food", which is a synonym of the word "foodstuff", and a word "recipe", which is a hypernym of the word "foodstuff". The related words of the word "Diet" are a word "Lower House" and "Upper House", which are hyponyms of the word "Diet". The related words of the word "Lower House" are a word "Diet", which is a hypernym of the word "Lower House", and a word "Upper House", which is a relevant term of the word "Lower House". The related words of the word "Upper House" are a word "Diet", which is a hypernym of the word "Upper House", and a word "Lower House", which is a relevant term of the word "Upper House". The related words of the word "animal" are a word "creature", which is a synonym of the word "animal", and a word "living thing", which is a hypernym of the word "animal". The related words of the word "food" are words "cooking ingredient" and "barbecue", which are hyponyms of the word "food", and so on.

Figure 10:
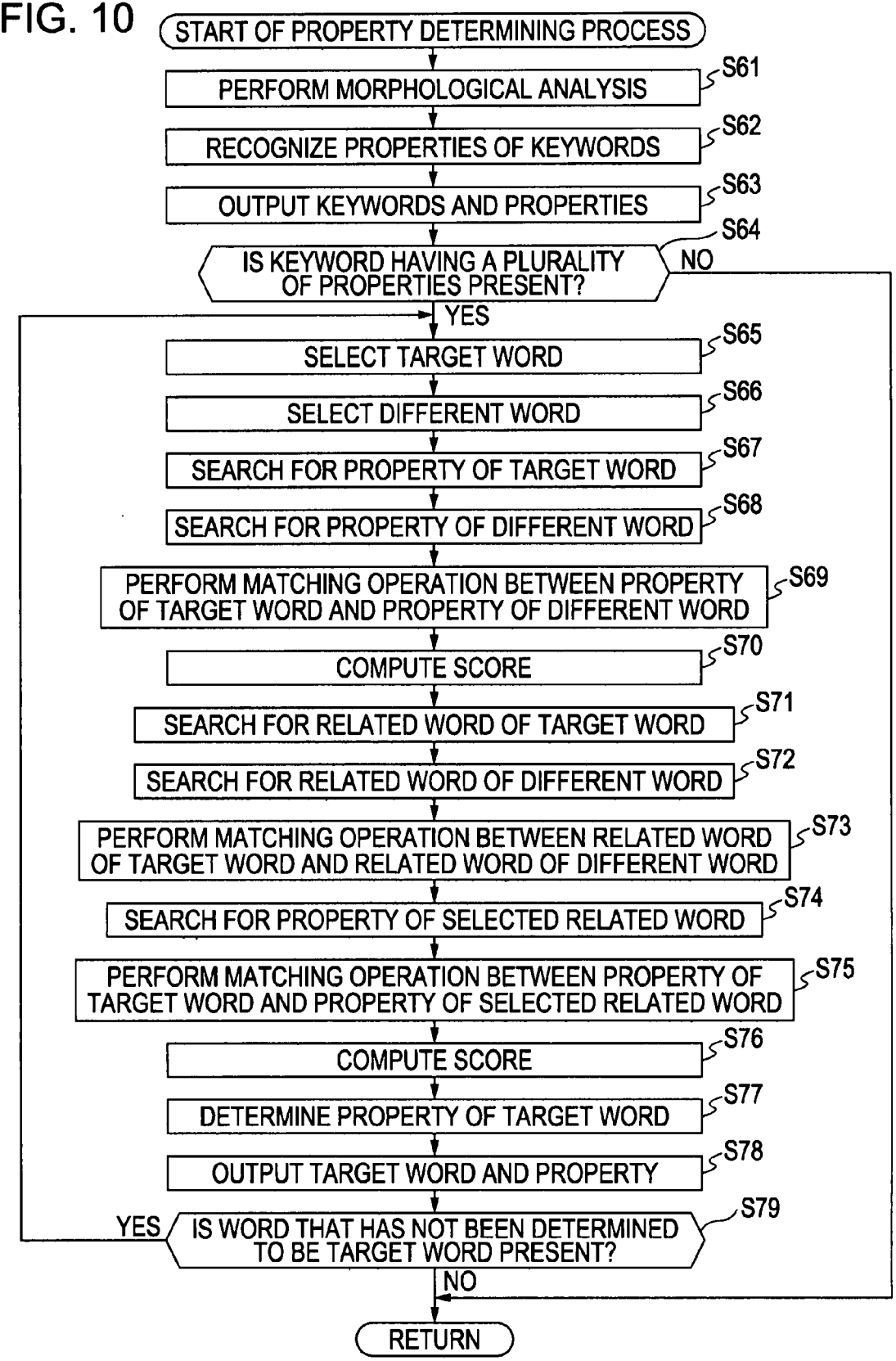
FIG. 10 is a flow chart illustrating another example of the property determining process.

The property determining process performed by the property determining unit 52 shown in FIG. 8 at step S2 of FIG. 5 is described in detail next with reference to FIG. 10.

The processes performed at steps S61 through S69 are similar to those performed at steps S21 through S29 in FIG. 6. Accordingly, detailed descriptions are not repeated. For example, when the content information about a program is a sentence "Japan Diet includes Lower House and Upper House", keywords "Japan", "Diet", "Lower House", and "Upper House" are extracted through these processes.

In addition, on the basis of the property dictionary shown in FIG. 4, the keyword "Diet" having two properties "organization" and "architecture" is determined to be a target word. Subsequently, a word "organization", which is the property of different words "Lower House" and "Upper House", is searched for on the basis of the property dictionary shown in FIG. 4. Since the property "organization" of the target word matches the property "organization" of the different words "Lower House" and "Upper House", the property "organization" is supplied to the score computing unit 77 together with the match count of 2.

At step S70, the score computing unit 77 computes the score of each of the properties of the target word supplied from the matching unit 94 on the basis of the match count supplied from the matching unit 94 and a predetermined weight coefficient. The process then proceeds to step S71.

At step S71, the target-word thesaurus searching unit 91 searches the thesaurus stored in the thesaurus storage unit 93 for a related word of the target word selected by the target word selection unit 72. The target-word thesaurus searching unit 91 then supplies the found related word to the matching unit 94.

For example, the target-word thesaurus searching unit 91 searches the thesaurus shown in FIG. 9 for related words "Lower House" and "Upper House" of the target word "Diet". Note that the related words "Lower House" and "Upper House" have a relationship "hyponym" with respect to the target word "Diet".

After the process at step S71 is completed, the process proceeds to step S72. At step S72, the different-word thesaurus searching unit 92 searches the thesaurus stored in the thesaurus storage unit 93 for a related word of the different word selected by the target word selection unit 72. Thereafter, the different-word thesaurus searching unit 92 supplies the found related word to the matching unit 94.

For example, the different-word thesaurus searching unit 92 searches the thesaurus shown in FIG. 9 for related words "Diet" and "Lower House" of the different word "Upper House" and related words "Diet" and "Upper House" of the different word "Lower House". Note that the related words "Diet" has a relationship "hypernym", and each of the related words "Lower House" and "Upper House" has a relationship "relative term".

After the process at step S72 is completed, the process proceeds to step S73. At step S73, the matching unit 94 performs a matching operation between the related word of the target word supplied from the target-word thesaurus searching unit 91 and the related word of the different word supplied from the different-word thesaurus searching unit 92. Thereafter, as a result of the matching operation, the matching unit 94 supplies the related word of the target word that is determined to match the related word of the different word to the selected property searching unit 95 as a selected related word.

For example, the matching unit 94 performs a matching operation among each of the related words "Lower House" and "Upper House" of the target word "Diet", each of the related words "Diet" and "Upper House" of the different word "Lower House", and each of the related words "diet" and "lower House" of the different word "Upper House". As a result of the matching operation, the matching unit 94 supplies the related word "Upper House" of the target word "Diet" that is determined to match the related word "Upper House" of the different word "Lower House" and the related word "Lower House" of the target word "Diet" that is determined to match the related word "Lower House" of the different word "Upper House" to the selected property searching unit 95 as selected related words.

After the process at step S73 is completed, the process proceeds to step S74. At step S74, the selected property searching unit 95 searches the property dictionary stored in the property dictionary storage unit 75 for the property of the selected related word supplied from the matching unit 94 as the property of the selected related word. Subsequently, the selected property searching unit 95 supplies the found property to the matching unit 94. For example, the selected property searching unit 95 searches the property dictionary shown in FIG. 4 for the property "organization" of the selected related words "Lower House" and "Upper House" supplied from the matching unit 94. Thereafter, the selected property searching unit 95 supplies the property "organization" to the matching unit 94.

After the process at step S74 is completed, the process proceeds to step S75. At step S75, the matching unit 94 performs a matching operation between the property of the target word found by the target-word property searching unit 73 and the property of the selected related word supplied from the selected property searching unit 95. Subsequently, as a result of the matching operation, the matching unit 94 supplies each of the properties of the target word to the score computing unit 77 together with the match count between the property and the properties of the selected related word.

For example, the matching unit 94 performs a matching operation between each of the properties "organization" and "architecture" of the target word "Diet" and the property "organization" of the selected related words "Lower House" and "Upper House". Subsequently, as a result of the matching operation, the matching unit 94 supplies the property "organization" of the target word "Diet" that is determined to match the property "organization" of the selected related words "Lower House" and "Upper House" to the score computing unit 77 together with the match count of 2 regarding the property.

After the process at step S75 is completed, the process proceeds to step S76. At step S76, the score computing unit 77 computes the score of each of the properties of the target word on the basis of the match count supplied from the matching unit 94 at step S75 and a predetermined weight coefficient. Subsequently, the score computing unit 77 sums this score and the score computed at step S70 for each of the properties of the target word. The sum serves as a final score of each of the properties. The score computing unit 77 then supplies the score to the determining unit 78 together with the property.

After the process at step S76 is completed, the process proceeds to step S77. At step S77, the determining unit 78 determines the property having the highest score to be the property of the target word of the program on the basis of the properties and scores supplied from the score computing unit 77. For example, the determining unit 78 determines the property "organization" having the highest score to be the property of the target word "Diet".

Since the processes performed at steps S78 and S79 are similar to the processes performed at steps S32 and S33 shown in FIG. 6, descriptions are not repeated.

As described above, the property determining unit 52 shown in FIG. 8 searches for related words of a target word and a different word. Subsequently, the property determining unit 52 performs a matching operation between the property of the selected related word that is determined to match the related word of the different word and the property of the target word. In related technologies, although the meaning of the target word is similar to that of the property of a different word, those properties could not be determined to match due to several different ways of the spelling. However, according to the present embodiment, the possibility of such a property of the target word being determined to be the property of the target word of a program can be increased. Consequently, the property of a keyword that is optimal for the program can be selected.

Figure 11:
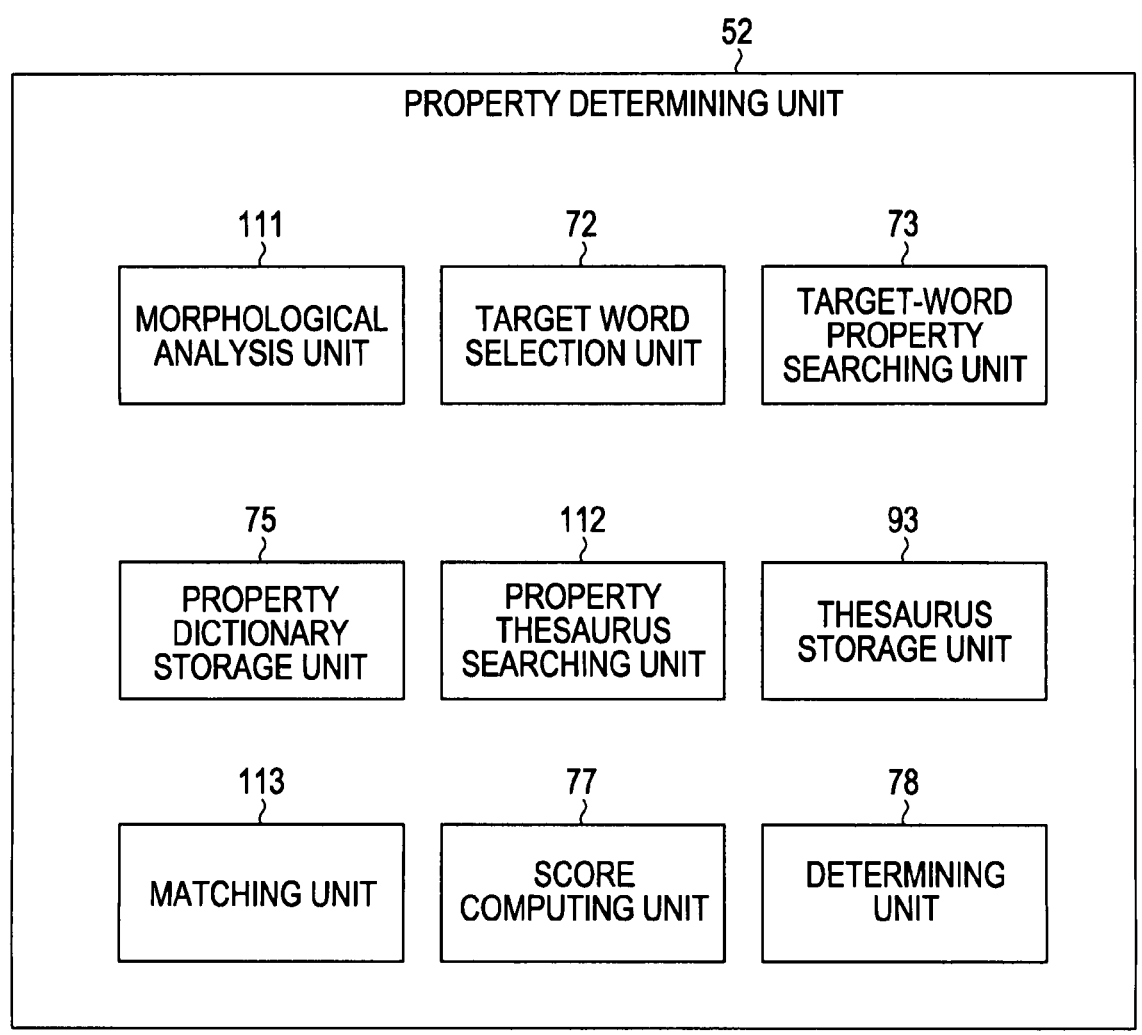
FIG. 11 is a block diagram illustrating still another example of the configuration of the property determining unit in detail.

FIG. 11 is a detailed block diagram of another configuration of the property determining unit 52 shown in FIG. 2.

As shown in FIG. 11, a property determining unit 52 includes the target word selection unit 72, the target-word property searching unit 73, the property dictionary storage unit 75, the score computing unit 77, the determining unit 78, the thesaurus storage unit 93, a morphological analysis unit 111, a property thesaurus searching unit 112, and a matching unit 113. The property determining unit 52 determines the property of a keyword on the basis of a related word of the property of a keyword other than the keyword and a genre word stored in the content information. Similar numbering will be used in describing FIG. 11 as was utilized above in describing FIGS. 3 and 8. Therefore, descriptions are not repeated.

The morphological analysis unit 111 performs a morphological analysis on the content information and genre information supplied from the extracting unit 51 shown in FIG. 2. Thus, the content information and the genre information are separated into words. A word type of each of the words is identified. Like the morphological analysis unit 71 shown in FIGS. 3 and 8, the morphological analysis unit 111 extracts a keyword from among the words contained in the content information and supplies the extracted keyword to the target word selection unit 72. In addition, the morphological analysis unit 111 extracts genre words from the genre information and supplies the extracted genre words to the matching unit 113.

The property thesaurus searching unit 112 considers the property of the target word found by the target-word property searching unit 73 as a word. Subsequently, the property thesaurus searching unit 112 searches the thesaurus stored in the thesaurus storage unit 93 for a related word of the word. The property thesaurus searching unit 112 then supplies the related word of the property of the target word to the matching unit 113.

The matching unit 113 performs a matching operation between the related word of the property of the target word supplied from the property thesaurus searching unit 112 and the genre word supplied from the morphological analysis unit 111. Subsequently, in accordance with the result of the matching operation, the matching unit 113 supplies each of the properties of the target word to the score computing unit 77 together with the match count between the related word of the property and the genre word.

In the example shown in FIG. 11, the score computing unit 77 employs a weight coefficient in order to compute a score. Different weight coefficients are used according to the type of relationship assigned to a related word to be matched.

A property determining process performed by the property determining unit 52 shown in FIG. 11 at step S2 of FIG. 5 is described in detail next with reference to FIG. 12.

At step S91, the morphological analysis unit 111 performs morphological analysis on the content information and the genre information supplied from the extracting unit 51. Like the morphological analysis unit 71 shown in FIGS. 3 and 8, the morphological analysis unit 111 extracts a keyword from among the words contained in the content information and supplies the extracted keyword to the target word selection unit 72. In addition, the morphological analysis unit 111 extracts a genre word from the genre information and supplies the genre word to the matching unit 113.

For example, assume that the content information contains a title "Animal Paradise" and an annotation "This is a program that explores cattle's interesting behavior", and the genre contains "nature/animal/environment". Then, the morphological analysis unit 111 extracts the words "animal", "paradise", "program", "cattle", and "behavior" as keywords. In addition, the morphological analysis unit 111 extracts the words "nature", "animal", and "environment" as genre words.

Figure 7:
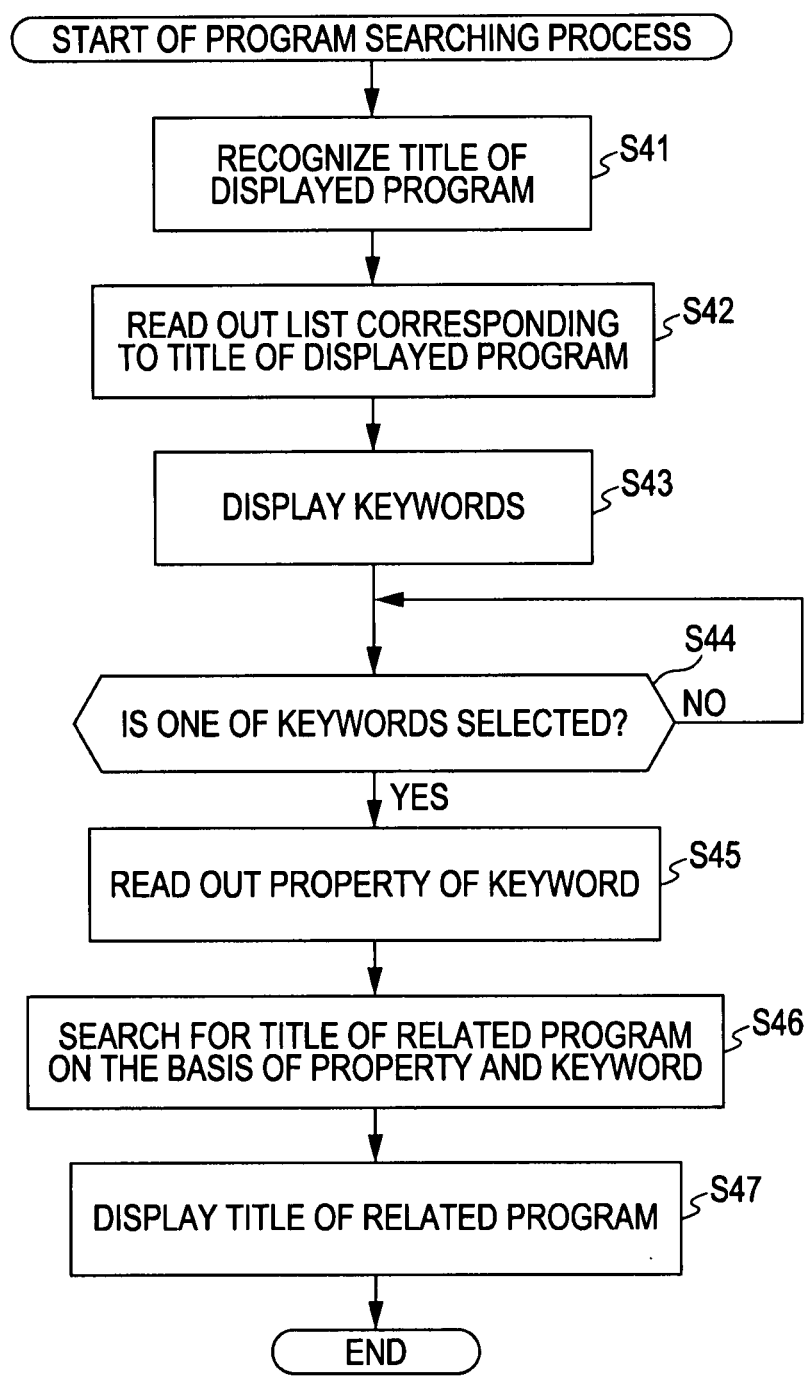
FIG. 7 is a flow chart illustrating a program searching process.

The processes performed at steps S92 through S96 are similar to those performed at steps S22 through S25 of FIG. 6 and step S27 of FIG. 7. Accordingly, detailed descriptions are not repeated. For example, the keyword "cattle" having two properties "animal" and "food" is determined to be a target word on the basis of the property dictionary shown in FIG. 4 through these processes.

After the process at step S96 is completed, the process proceeds to step S97. At step S97, the property thesaurus searching unit 112 considers the property of the target word found by the target-word property searching unit 73 as a word. Subsequently, the property thesaurus searching unit 112 searches the thesaurus stored in the thesaurus storage unit 93 for a related word of the word as the related word of the property of the target word. The property thesaurus searching unit 112 then supplies the related word of the property of the target word to the matching unit 113.

For example, the property thesaurus searching unit 112 searches the thesaurus shown in FIG. 9 for related words "creature" and "living things" of the property "animal" of the target word "cattle". In addition, the property thesaurus searching unit 112 searches for related words "cooking ingredient" and "barbecue" of the property "food" of the target word "cattle". Thereafter, the property thesaurus searching unit 112 supplies these related words to the matching unit 113.

After the process at step S97 is completed, the process proceeds to step S98. At step S98, the matching unit 113 performs a matching operation between the related word of the property of the target word supplied from the property thesaurus searching unit 112 and the genre word supplied from the morphological analysis unit 111. Subsequently, in accordance with the result of the matching operation, the matching unit 113 supplies each of the properties of the target word to the score computing unit 77 together with the match count between the related word of the property and the genre word.

For example, the matching unit 113 performs a matching operation between the related words "creature" and "living things" of the property "animal" of the target word "cattle" and the genre words "nature", "creature", and "environment". In addition, the matching unit 113 performs a matching operation between the related words "cooking ingredient" and "barbecue" of the property "food" of the target word "cattle" and the genre words "nature", "creature", and "environment". Subsequently, in accordance with the result of the matching operation, the matching unit 113 supplies the property "animal" of the target word "cattle" corresponding to the related word "creature" that is determined to match the genre word "creature" to the score computing unit 77 together with the match count of 1 between the related word "creature" of the property "animal" and the genre word "creature".

The processes performed at steps S99 through S102 are similar to those performed at steps S30 through S33 of FIG. 6. Accordingly, descriptions are not repeated. For example, the determining unit 78 determines the property "animal" having the highest score to be the property of the target word "cattle" through these processes.

As described above, the property determining unit 52 shown in FIG. 11 determines the property of the target word of the program on the basis of the related word of the property of the target word and the match count between the related word and the genre word. Accordingly, the property determining unit 52 can determine the property related to the genre of the program to be the property of the target word of the program. As a result, the property determining unit 52 can determine the property of the keyword optimum for the content of the program.

Figure 13:
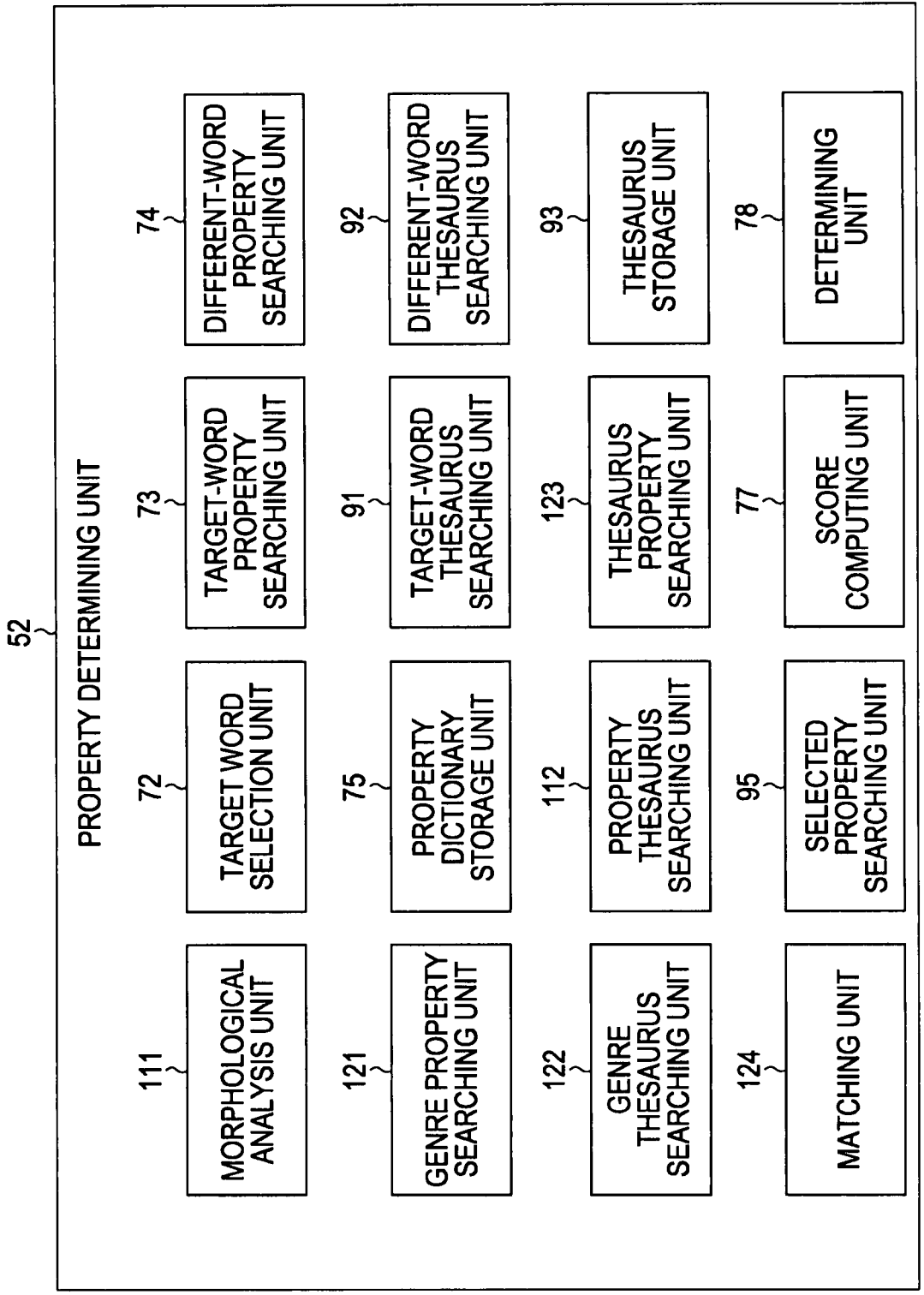
FIG. 13 is a block diagram illustrating yet still another example of the configuration of the property determining unit in detail.

FIG. 13 is a detailed block diagram of still another configuration of the property determining unit 52 shown in FIG. 2.

As shown in FIG. 13, a property determining unit 52 includes the target word selection unit 72, the target-word property searching unit 73, the different-word property searching unit 74, the property dictionary storage unit 75, the score computing unit 77, the determining unit 78, the target-word thesaurus searching unit 91, the different-word thesaurus searching unit 92, the thesaurus storage unit 93, the selected property searching unit 95, the morphological analysis unit 111, the property thesaurus searching unit 112, a genre property searching unit 121, a genre thesaurus searching unit 122, a thesaurus property searching unit 123, and a matching unit 124.

The property determining unit 52 shown in FIG. 13 determines the property of a keyword on the basis of the properties of a keyword other than the keyword and a genre word, the related word of the property, and a related word stored in the content information. Similar numbering will be used in describing FIG. 13 as was utilized above in describing FIGS. 3, 8, and 11. Therefore, descriptions are not repeated.

The genre property searching unit 121 searches the property dictionary stored in the property dictionary storage unit 75 for the property of a genre word supplied from the morphological analysis unit 111 and supplies the property of the genre word to the matching unit 124.

The genre thesaurus searching unit 122 searches the thesaurus stored in the thesaurus storage unit 93 for the related word of a genre word extracted by the morphological analysis unit 111 and supplies the related word of the genre word to the matching unit 124.

The thesaurus property searching unit 123 searches the property dictionary stored in the property dictionary storage unit 75 for the property of a related word of the property of the target word found by the property thesaurus searching unit 112 and supplies the property of the related word of the property of the target word to the matching unit 124.

The matching unit 124 performs a matching operation (hereinafter referred to as a "direct matching operation") between each of the property of the target word supplied from the target-word property searching unit 73, the related word of the property of the target word supplied from the property thesaurus searching unit 112, and the property of a related word of the property of the target word supplied from the thesaurus property searching unit 123 and each of a different word selected by the target word selection unit 72 and the genre word extracted by the morphological analysis unit 111. Subsequently, in accordance with the result of the direct matching operation, the matching unit 124 supplies each of the properties of the target word to the score computing unit 77 together with the match count between each of the property, the related word of the property, and the property of the related word of the property and each of the different word and the genre word.

In addition, the matching unit 124 performs a matching operation (hereinafter referred to as a "property matching operation) between each of the property of the target word, the related word of the property of the target word, and the property of a related word of the property of the target word and each of the property of a different word supplied from the different-word property searching unit 74 and the property of the genre word supplied from the genre property searching unit 121. Subsequently, in accordance with the result of the property matching operation, the matching unit 124 supplies each of the properties of the target word to the score computing unit 77 together with the match count between each of the property, the related word of the property, and the property of the related word of the property and each of the property of the different word and the property of the genre word.

Furthermore, the matching unit 124 performs a matching operation between the related word of the target word supplied from the target-word thesaurus searching unit 91 and each of the related word of the different word supplied from the different-word thesaurus searching unit 92 and the related word of the genre word supplied from the genre thesaurus searching unit 122. Subsequently, in accordance with the result of the matching operation, the matching unit 124 supplies the related word of the target word that is determined to match the related word of the different word or the related word of the genre word to the selected property searching unit 95 as a selected related word.

Still furthermore, the matching unit 124 performs a matching operation (hereinafter referred to as a "related-word matching operation) between each of the property of the target word, the related word of the property of the target word, and the property of a related word of the property of the target word and the property of the selected related word supplied from the selected property searching unit 95. Subsequently, in accordance with the related-word matching result, the matching unit 124 supplies each of the properties of the target word to the score computing unit 77 together with the match count between each of the properties of the target word, the related word of the property, and the property of the related word of the property and the property of the selected related word.

In an example shown in FIG. 13, for the match count in accordance with the direct matching operation, a coefficient (hereinafter referred to as a "direct coefficient") that varies according to the position of a different word of the matching target in the content information, whether the matching target is a different word or a genre word, or the type of a relationship of the related word or a word that derives from the related word serving as the matching target is used as a weight coefficient by the score computing unit 77 when the score computing unit 77 computes the score.

For example, the direct coefficient is determined so as to be higher in the case where the matching target is a genre word than in the case where the matching target is a different word.

In addition, for the match count in accordance with the property matching operation, a coefficient (hereinafter referred to as a "property coefficient") that varies according to the position of a different word in the content information from which the matching target derives, whether the matching target derives a different word or a genre word, or the type of a relationship of the related word or a word from which the related word serving as the matching target derives is used as a weight coefficient.

Furthermore, for the match count in accordance with the related-word matching operation, a coefficient (hereinafter referred to as a "related-word coefficient") that varies according to the position of a different word in the content information, whose related word is determined to match the property of a selected related word, whether the matching target is the property of the selected related word determined to match the related word of the different word or the related word of the genre word, or the type of a relationship of the related word or a word from which the related word serving as the matching target derives is used as a weight coefficient.

The score computing unit 77 shown in FIG. 13 sums the scores computed in accordance with the direct matching, the property matching, and the related-word matching for each of the properties of the target word. The sum is determined to be a final score of the property. The sum is supplied to the determining unit 78 together with the property.

The property determining process performed by the property determining unit 52 shown in FIG. 13 at step S2 of FIG. 5 is described in detail next with reference to FIGS. 14 and 15.

Figure 12:
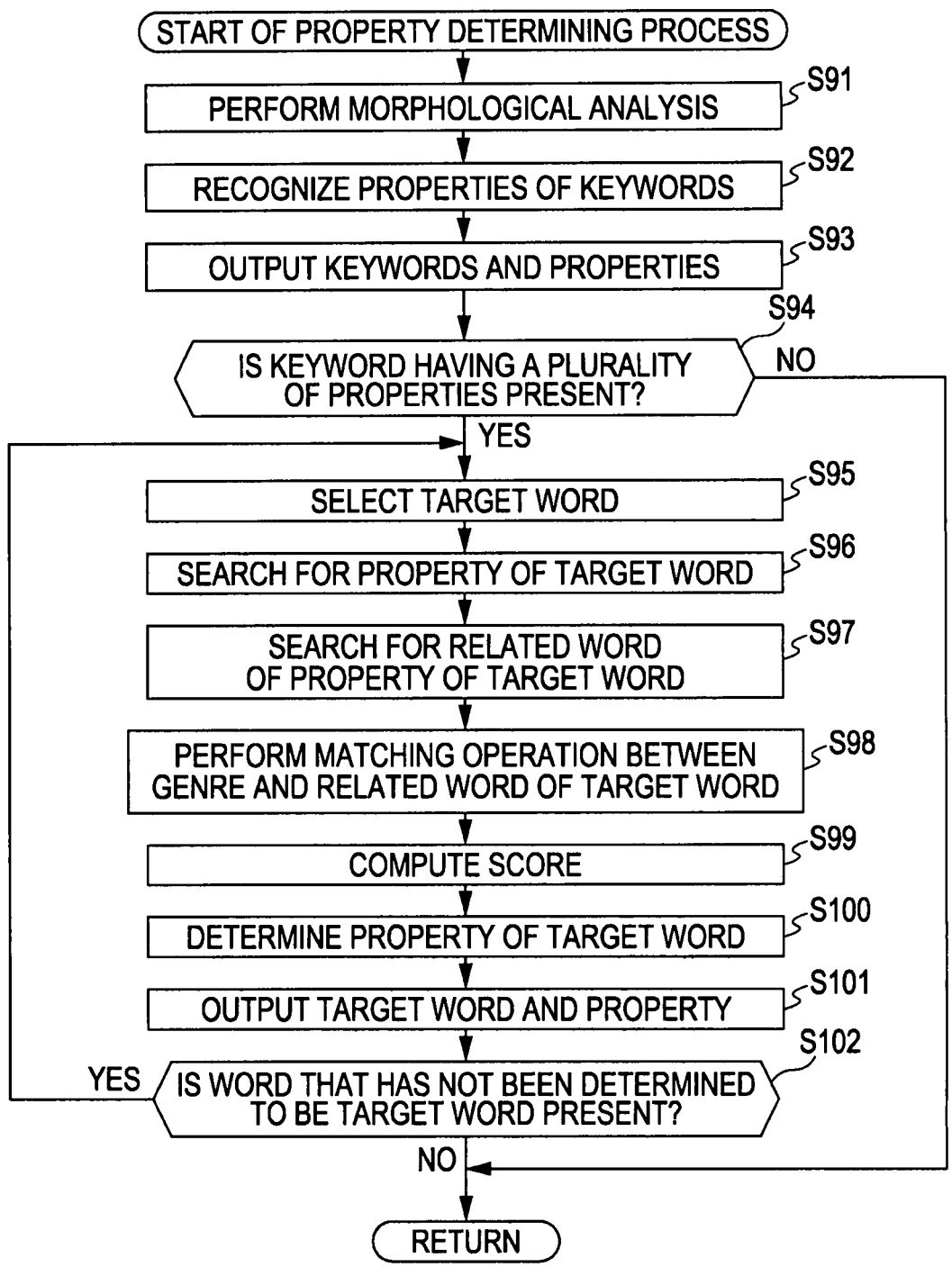
FIG. 12 is a flow chart illustrating yet still another property determining process.

The processes performed at steps S111 through S117 are similar to those performed at step S91 of FIG. 12 and steps S22 through S27 of FIG. 6. Accordingly, detailed descriptions are not repeated. For example, when the content information about a program is a sentence "This takes us on a barbecue tour, in which we can eat prime cattle inexpensively" and the genre is "food/variety program", keywords "barbecue", "tour", and "cattle" are extracted through these processes. In addition, the genre words "food" and "variety program" are extracted through these processes.

In addition, on the basis of the property information shown in FIG. 4, for example, the keyword "cattle" having two properties "animal" and "food" is determined to be a target word. On the basis of the property dictionary shown in FIG. 4, a property "food" is determined to be the property of the different word "barbecue".

At step S118, as in step S97 of FIG. 12, the property thesaurus searching unit 112 considers the property of the target word found by the target-word property searching unit 73 as a word. Subsequently, the property thesaurus searching unit 112 searches the thesaurus stored in the thesaurus storage unit 93 for a related word of that word. The property thesaurus searching unit 112 then supplies the related word of the property of the target word to the matching unit 124. For example, the property thesaurus searching unit 112 searches the thesaurus shown in FIG. 9 for the related words "creature" and "living things" of the property "animal" of the target word "cattle" and the related words "cooking ingredient" and "barbecue" of the property "food". Thereafter, the property thesaurus searching unit 112 supplies these related words to the matching unit 124.

After the process at step S118 is completed, the process proceeds to step S119. At step S119, the thesaurus property searching unit 123 searches the property dictionary stored in the property dictionary storage unit 75 for the property of a related word of the property of the target word found by the property thesaurus searching unit 112 and supplies the property of the related word of the property of the target word to the matching unit 124. For example, the thesaurus property searching unit 123 searches the property dictionary shown in FIG. 4 for the property "food" of the related word "barbecue" of the properties "animal" and "food" of the target word "cattle".

After the process at step S119 is completed, the process proceeds to step S120. At step S120, the matching unit 124 performs a direct matching operation. Subsequently, in accordance with the result of the direct matching operation, the matching unit 124 supplies each of the properties of the target word to the score computing unit 77 together with the match count between one of the property, the related word of the property, and the property of the related word of the property and each of the different word and the genre word.

The matching unit 124 performs a direct matching operation between each of the properties "animal" and "food" of the target word "cattle", the related words "barbecue", "creature", "living things" and "cooking ingredient" of the properties "animal" and "food" of the target word "cattle", and the property "food" of the related word "barbecue" of the property "food" of the target word "cattle" and each of the different words "excellent", "inexpensive", "barbecue", and "tour" and the genre words "foodstuff" and "variety program". In this case, there are no properties of the target word that are determined to match the different words or the genre words, the related words of the property of the target word, or the property of the related word of the property of the target word. Accordingly, the matching unit 124 supplies each of the properties of the target word to the score computing unit 77 together with the match count of zero.

After the process at step S120 is completed, the process proceeds to step S121. At step S121, the score computing unit 77 computes the score of each of the properties of the target word supplied from the matching unit 124 using the match count supplied from the matching unit 124 and a predetermined weight coefficient.

After the process at step S121 is completed, the process proceeds to step S122. At step S122, as in step S28 of FIG. 6, the different-word property searching unit 74 searches the property dictionary stored in the property dictionary storage unit 75 for the property of the different word supplied from the target word selection unit 72 as the property of the different word. The different-word property searching unit 74 then supplies the property of the different word to the matching unit 124. For example, the different-word property searching unit 74 searches the property dictionary shown in FIG. 4 for the property "food" of the different word "barbecue".

After the process at step S122 is completed, the process proceeds to step S123. At step S123, the genre property searching unit 121 searches the property dictionary stored in the property dictionary storage unit 75 for the property of a genre word supplied from the morphological analysis unit 111 and supplies the property of the genre word to the matching unit 124. For example, the genre property searching unit 121 searches the property dictionary shown in FIG. 4 so as to acquire the properties "food" and "program genre" of the genre words "foodstuff" and "variety program".

Figure 15:
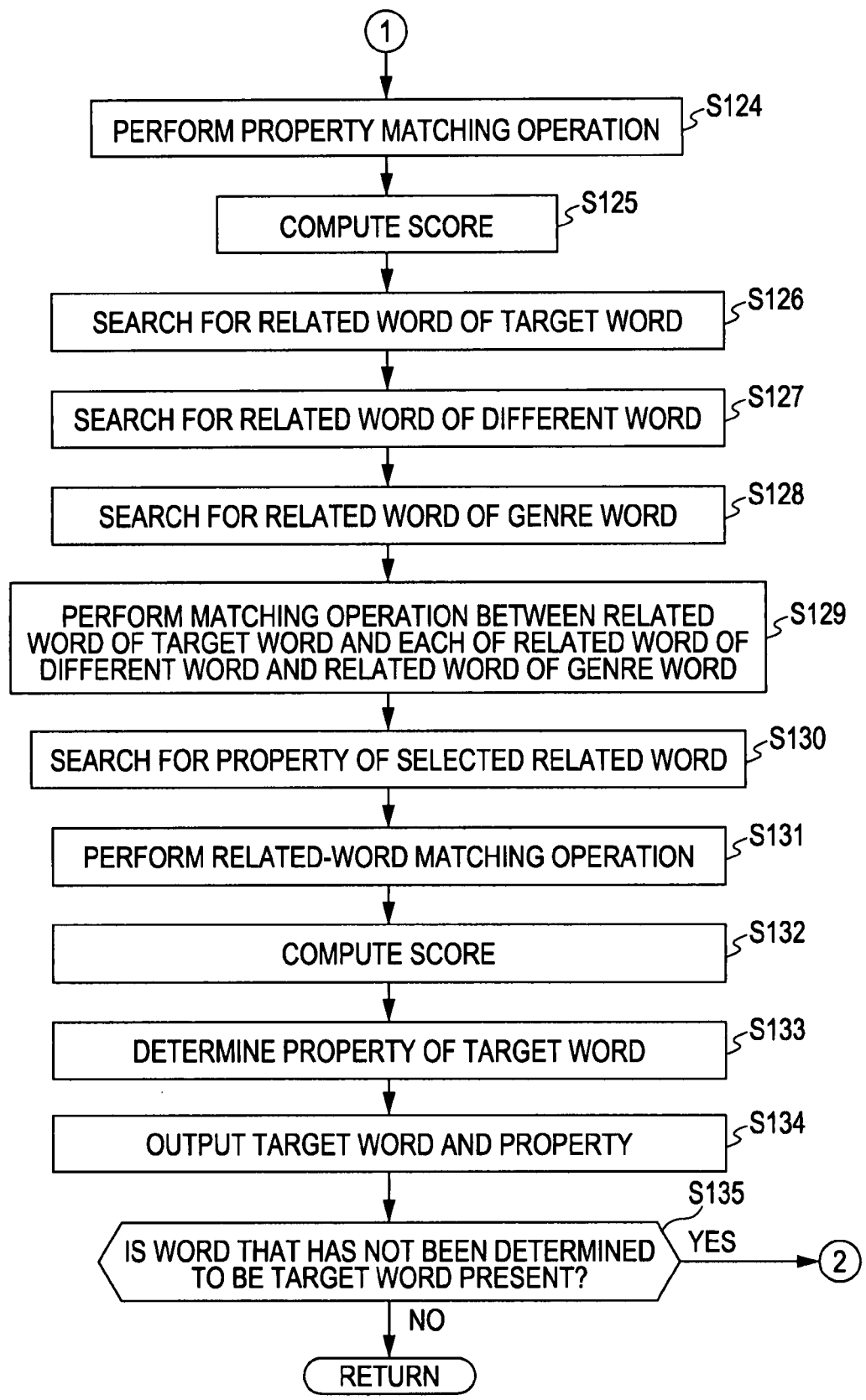
FIG. 15 is a flow chart illustrating yet still another property determining process.

After the process at step S123 is completed, the process proceeds to step S124 of FIG. 15. At step S124, the matching unit 124 performs a property matching operation. Subsequently, in accordance with the result of the property matching operation, the matching unit 124 supplies each of the properties of the target word to the score computing unit 77 together with the match count between one of the property, the related word of the property, and the property of the related word of the property and each of the property of the different word and the property of the genre word.

For example, the matching unit 124 determines whether each of the following first items matches any of the following second items. The first items are the properties "animal" and "food" of the target word "cattle", the related words "barbecue", "creature", "living things", and "cooking ingredient" of the properties "animal" and "food" of the target word "cattle", and the property "food" of the related word "barbecue" of the property "food" of the target word "cattle". The second items are the property "food" of the different word "barbecue" supplied from the different-word property searching unit 74 and the properties "food" and "program genre" of the genre words "foodstuff" and "variety program".

Subsequently, in accordance with the property matching result, the matching unit 124 supplies the property "food" of the target word "cattle" that is determined to match the property "food" of the different word and the property "food" of the genre word "foodstuff" to the score computing unit 77 together with the match count of "2".

After the process at step S124 is completed, the process proceeds to step S125. At step S125, as in step S121 of FIG. 14, the score computing unit 77 computes the score of each of the properties of the target word supplied from the matching unit 124 using the match count supplied from the matching unit 124 and a predetermined weight coefficient.

After the process at step S125 is completed, the process proceeds to step S126. At step S126, as in step 71 of FIG. 10, the target-word thesaurus searching unit 91 searches the thesaurus stored in the thesaurus storage unit 93 for a related word of the target word selected by the target word selection unit 72. The target-word thesaurus searching unit 91 then supplies the found related word to the matching unit 94. For example, the target-word thesaurus searching unit 91 searches the thesaurus shown in FIG. 9 for the related words "animal" and "meat" of the target word "cattle".

After the process at step S126 is completed, the process proceeds to step S127. At step S127, as in step S72 of FIG. 10, the different-word thesaurus searching unit 92 searches the thesaurus stored in the thesaurus storage unit 93 for a related word of the different word selected by the target word selection unit 72. Thereafter, the different-word thesaurus searching unit 92 supplies the found related word of the different word to the matching unit 124. For example, the different-word thesaurus searching unit 92 searches the thesaurus shown in FIG. 9 for the related words "food" and "meat" of the different word "barbecue".

After the process at step S127 is completed, the process proceeds to step S128. At step S128, the genre thesaurus searching unit 122 searches the thesaurus stored in the thesaurus storage unit 93 for the related word of a genre word extracted by the morphological analysis unit 111 and supplies the related word of the genre word to the matching unit 124. For example, the genre thesaurus searching unit 122 searches for the related words "food" and "recipe" of the genre word "foodstuff".

After the process at step S128 is completed, the process proceeds to step S129. At step S129, the matching unit 124 performs a matching operation between the related word of the target word supplied from the target-word thesaurus searching unit 91 and each of the related word of the different word supplied from the different-word thesaurus searching unit 92 and the related word of the genre word supplied from the genre thesaurus searching unit 122. Subsequently, in accordance with the matching result, the matching unit 124 supplies the related word of the target word that is determined to match the related word of the different word or the related word of the genre word to the selected property searching unit 95 as a selected related word.

For example, the matching unit 124 performs a matching operation between the related words "animal" and "meat" of the target word "cattle" and each of the related words "food" and "meat" of the different word "barbecue" and the related words "food" and "recipe" of the genre word "foodstuff". Subsequently, in accordance with the matching result, the matching unit 124 supplies the related word "meat" of the target word "cattle" that is determined to match the related word "meat" of the different word "barbecue" to the selected property searching unit 95 as a selected related word.

After the process at step S129 is completed, the process proceeds to step S130. At step S130, as in step S74 of FIG. 10, the selected property searching unit 95 searches the property dictionary stored in the property dictionary storage unit 75 for the property of the selected related word supplied from the matching unit 94 as the property of the selected related word. Subsequently, the selected property searching unit 95 supplies the found property of the selected related word to the matching unit 124. For example, the selected property searching unit 95 searches the property dictionary shown in FIG. 4 for the property "food" of the selected related word "meat" and supplies the found property "food" to the matching unit 124.

After the process at step S130 is completed, the process proceeds to step S131. At step S131, the matching unit 124 performs a related-word matching operation. Subsequently, in accordance with the related-word matching result, the matching unit 124 supplies each of the properties of the target word to the score computing unit 77 together with the match count between one of the property, the related word of the property, and the property of the related word of the property and the property of the selected related word.

For example, the matching unit 124 performs a matching operation between each of the properties "animal" and "food" of the target word "cattle", the related words "barbecue", "creature", "living things" and "cooking ingredient" of the properties "animal" and "food" of the target word "cattle", and the property "food" of the related word "barbecue" of the property "food" of the target word "cattle" and the property "food" of the selected related word "meat". Subsequently, in accordance with the related-word matching result, the matching unit 124 supplies the property "food" of the target word "cattle" to the score computing unit 77 together with the match count of "2", since the property "food" of the target word "cattle" and the property "food" of the related word "barbecue" of the property "food" of the target word "cattle" match the property "food" of the selected related word "meat".

After the process at step S131 is completed, the process proceeds to step S132. At step S132, as in steps S121 and S125, the score computing unit 77 computes the score of each of the properties of the target word supplied from the matching unit 124 using the match count supplied from the matching unit 124 and a predetermined weight coefficient. Subsequently, the score computing unit 77 sums that score, the score computed at step S21 of FIG. 14, and the score computed at step S125 for each of the properties of the target word. The sum is determined to be a final score of the property. The sum is supplied to the determining unit 78 together with the property.

The processes performed at steps S133 through S135 are similar to those performed at steps S31 through S33 of FIG. 6. Accordingly, descriptions are not repeated.

Figure 14:
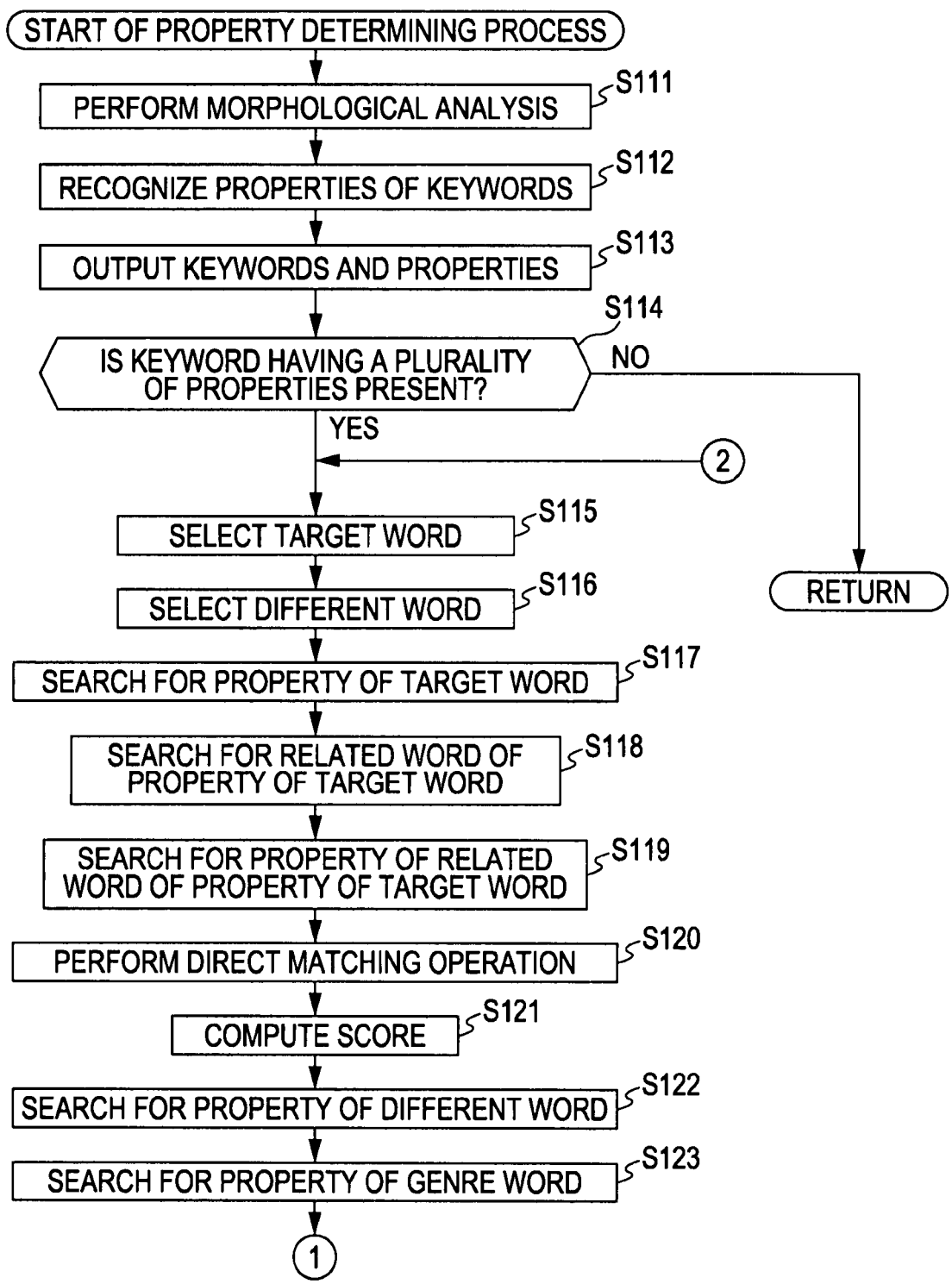
FIG. 14 is a flow chart illustrating yet still another property determining process.
Figure 16:
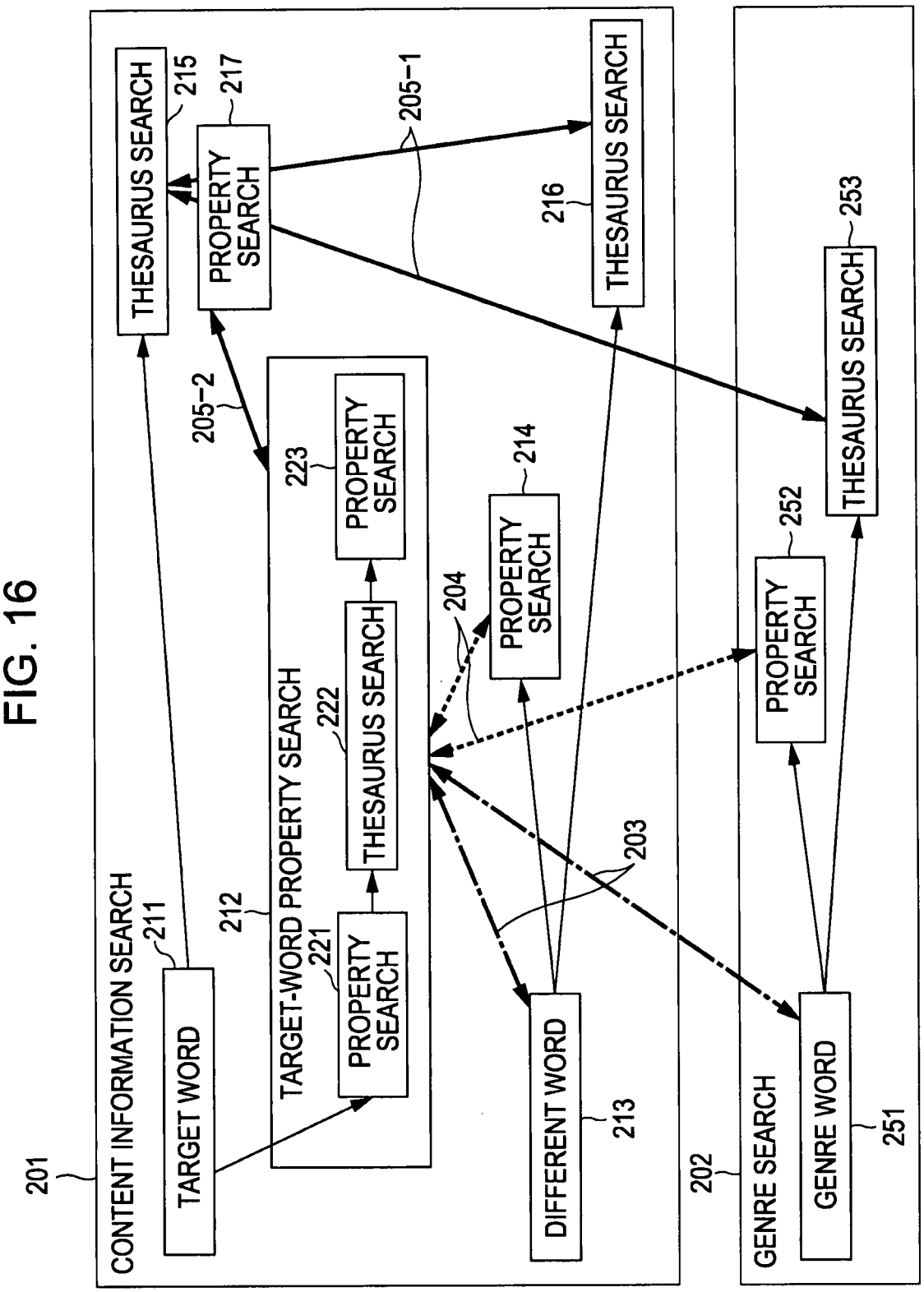
FIG. 16 is a schematic illustration of a search operation and a matching operation in the property determining process.

FIG. 16 is a schematic illustration of the search operation and the matching operation in the property determining process shown in FIG. 14.

As shown in FIG. 16, the search operation and the matching operation in the property determining process shown in FIG. 14 include a content information search sub-operation 201 that searches for pieces of information in the content information, a genre search sub-operation 202 that searches for pieces of information in the genre information, a direct matching sub-operation 203, a property matching sub-operation 204, a pre-related-word matching sub-operation 205-1, and a related-word matching sub-operation 205-2.

The content information search sub-operation 201 includes a target-word property search sub-operation 212 that searches for the property of a target word 211 or a word that derives from the property of the target word 211. The target-word property search sub-operation 212 includes a property search sub-operation 221 that searches for the property of the target word 211, a thesaurus search sub-operation 222 that searches for a related word of the property of the target word 211, and a property search sub-operation 223 that searches for the property of a related word of the property of the target word 211.

In addition, the content information search sub-operation 201 includes a property search sub-operation 214 that searches for the property of a different word 213, a thesaurus search sub-operation 215 that searches for a related word of the target word 211, a thesaurus search sub-operation 216 that searches for a related word of the different word 213, and a property search sub-operation 217 that searches for the property of the result output from the pre-related-word matching sub-operation 205-1.

The genre search sub-operation 202 includes a property search sub-operation 252 that searches for the property of a genre word 251 and a thesaurus search sub-operation 253 that searches for a related word of the genre word 251.

The direct matching sub-operation 203 performs a matching process between the result output from the target-word property search sub-operation 212 and each of the different word 213 and the genre word 251. The property matching sub-operation 204 performs a matching process between the result output from the target-word property search sub-operation 212 and each of the result output from the property search sub-operation 214 and the result output from the property search sub-operation 252.

The pre-related-word matching sub-operation 205-1 performs a matching process before the related-word matching sub-operation 205-2 is performed. The pre-related-word matching sub-operation 205-1 performs a matching process between the result output from the thesaurus search sub-operation 215 and each of the result output from the target-word property search sub-operation 212 and the result output from the property search sub-operation 217.

In the description above, the search of the property dictionary and the search of the thesaurus using a target word are alternately performed once. Alternatively, after the search of the property dictionary and the search of the thesaurus using the target word are alternately performed once, the search of the property dictionary is performed again. However, the search of the property dictionary and the search of the thesaurus using the target word may alternately be performed a plurality of times. Alternatively, after the search of the property dictionary and the search of the thesaurus using the target word are alternately performed a plurality of times, the search of the property dictionary may be performed again.

Furthermore, in the description above, one of the search of the property dictionary and the search of the thesaurus using a different word or a genre word is performed once. However, as in the case of a target word, the search of the property dictionary and the search of the thesaurus using a different word or a genre word may alternately be performed a predetermined number of times. Alternatively, after the search of the property dictionary and the search of the thesaurus using a different word or a genre word are alternately performed a plurality of times, the search of the property dictionary may be performed again.

While the exemplary embodiment above has been described with reference to the process in which the content information is extracted from the program-related information, the content information may be extracted from, for example, the closed caption of the program.

While the exemplary embodiment above has been described with reference to a search for a broadcast program as an example of a search for content, the content to be searched for may be a song, video, or text. For example, when content to be searched for is a web page in a website, the content information is extracted from the meta data of the content, such as RSS (rich site summary).

In addition, the present invention can be applied to applied to not only a television receiver that searches for a related program on the basis of a keyword, but also a recording apparatus that automatically records an image on the basis of a keyword, a search apparatus that searches for a related site on the basis of a keyword, and a determination apparatus that determines a genre of content on the basis of a keyword.

For example, when a user performs a predetermined operation on the recording apparatus according to the present invention while the recording apparatus is displaying a broadcast program, the recording apparatus executes a property determining process on the basis of the program-related information about the displayed broadcast program so as to display the keywords. When the user views the displayed keywords and selects a desired keyword, the recording apparatus stores the keyword selected by the user and the property of the keyword determined through the property determining process. Thereafter, the recording apparatus executes a property determining process on the basis of the program-related information about a program that can be received after the above-described operation is performed. Subsequently, the recording apparatus extracts a program corresponding to the stored keyword and property and automatically records the extracted program. As a result, the recording apparatus can automatically record a program having content similar to that of the currently displayed program.

Furthermore, when a user performs a predetermined operation on the search apparatus according to the present invention that is displaying a Web site, the search apparatus executes a property determining process on the basis of the RSS of the displayed website so as to store the keyword and the property of the keyword. Thereafter, the search apparatus executes a property determining process on the basis of the RSSes of other sites and searches for a site corresponding to the stored keyword and property. Thus, the search apparatus displays the information about the site as the information about a related site. As a result, the search apparatus can search for a site having content similar to the displayed site, and therefore, can provide the information to the user as the information about a related site.

Furthermore, the determination apparatus according to the present invention can execute a property determining process on the basis of information that describes the content and extract the property that can be found most frequently from all of the properties of the keyword determined through the property determining process. Thereafter, the determination apparatus determines the extracted property to be the genre of the content. As a result, the determination apparatus can determine the genre of the content using the information that describes the content.

In the present specification, the steps that describe the program stored in a recording medium include not only processes executed in the above-described sequence, but also processes that may be executed in parallel or independently.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   extracting means for identifying a word type of each word of content information that describes content and for extracting a plurality of words of a predetermined word type as keywords from the content information;
   property dictionary storage means for storing a property dictionary containing properties of words;
   property searching means for searching the property dictionary for the properties of the plurality of words extracted as the keywords, for selecting one of the keywords having a plurality of properties as a target word and for selecting keywords other than the target word as different words;
   property determining means for determining whether each of the properties of the target word matches any of the different words and determining whether each of the properties of the target word matches any of the properties of the different words; and
   determination means for determining a representative property of the target word of the content on the basis of a match count between the properties of the target word and (a) the different words and (b) the properties of the different words determined by the property determining means.

2. The information processing apparatus according to claim 1, further comprising:
   thesaurus storage means for storing a thesaurus that contains related words of the plurality of words; and
   related-word searching means for considering a property of the target word, as one of the plurality of words, and searching the thesaurus for a related word of the one of the plurality of words;
   wherein the property determining means further determines whether the related word of the property of the target word matches any of the different words or any of the properties of the different words.

3. The information processing apparatus according to claim 1, further comprising:
   thesaurus storage means for storing a thesaurus that contains related words of the plurality of words; and
   related-word searching means for considering a property of the target word, as one of the plurality of words, and searching the thesaurus for a related word of the one of the plurality of words;
   wherein the property searching means further searches the property dictionary for the property of the related word of the property of the target word, and wherein the property determining means further determines whether the property of the related word of the property of the target word matches any of the different words or any of properties of the different words.

4. The information processing apparatus according to claim 1, further comprising:
   thesaurus storage means for storing a thesaurus that contains related words of the plurality of words; and
   related-word searching means for considering a property of the target word, as one of the plurality of words, and searching the thesaurus for a related word of the one of the plurality of words;
   wherein the property searching means further searches the property dictionary for a property of the related word found by the related-word searching means, and wherein the related-word searching means further considers the property of the related word found by the property searching means as one of the plurality of words and searches the thesaurus for a related word of the one of the plurality of words as a related word of the found property, and wherein the search operation performed by the property searching means and the search operation performed by the related-word searching means are performed alternately and repeatedly, and wherein the property determining means further determines whether the related word or the property obtained through the alternate and repeated search operations matches any of the different words or any of the properties of the different words.

5. The information processing apparatus according to claim 1, further comprising:
   thesaurus storage means for storing a thesaurus that contains related words that are related to the plurality of words;
   related-word searching means for considering a related word of the target word, as a target-word related word, and searching the thesaurus for the target-word related word, the related-word searching means further considering a related word of a different word, as a different-word related word, and searching the thesaurus for the different-word related word; and
   related-word determining means for determining whether the target-word related word matches the different-word related word;
   wherein the property searching means further searches the property dictionary for a property of the target-word related word that is determined to match the different-word related word, and wherein the property determining means further determines whether the property of the target word matches the property of the target-word related word.

6. The information processing apparatus according to claim 1, wherein the property searching means further searches the property dictionary for properties of a genre of the content, and wherein the property determining means further determines whether a property of the target word matches the genre or a property of the genre.

7. The information processing apparatus according to claim 1, further comprising:
   computing means for computing a score of a property of the target word on the basis of a match count between the properties of the target word and the different words or the properties of the different words determined by the property determining means;
   wherein the determination means determines the representative property of the target word of the content on the basis of the score.

8. A method for processing information for an information processing device, comprising the steps of:
   identifying a word type of each word of content information that describes content;
   extracting a plurality of words of a predetermined word type as keywords from the content information;
   searching a property dictionary, containing properties of words, for the properties of the plurality of words extracted as the keywords;
   selecting one of the keywords having a plurality of properties as a target word;
   selecting keywords other than the target word as different words;
   determining whether each of the properties of the target word matches any of the different words and determining whether each of the properties of the target word matches any of the properties of the different words; and
   determining, using a processor, a representative property of the target word of the content on the basis of a match count between the properties of the target word and (a) the different words and (b) the properties of the different words determined by the property determining step.

9. A computer-readable program, embodied on a non-transitory computer readable medium, comprising program code for causing a computer to execute the processing steps of:
   identifying a word type of each word of content information that describes content;
   extracting a plurality of words of a predetermined word type as keywords from the content information;
   searching a property dictionary, containing the properties of words, for the properties of the plurality of words extracted as the keywords;
   selecting one of the keywords having a plurality of properties as a target word;
   selecting keywords other than the target word as different words;
   determining whether each of the properties of the target word matches any of the different words and determining whether each of the properties of the target word matches any of the properties of the different words; and
   determining a representative property of the target word of the content on the basis of a match count between the properties of the target word and (a) the different words and (b) the properties of the different words determined by the property determining step.

10. An information processing apparatus comprising:
   an extracting unit configured to identify a word type of each word of content information that describes content and to extract a plurality of words of a predetermined word type as keywords from the content information;
   a property dictionary storage unit configured to store a property dictionary containing properties of words;
   a property searching unit configured to search the property dictionary for the properties of the plurality of words extracted as the keywords, to select one of the keywords having a plurality of properties as a target word and to select keywords other than the target word as different words;

a property determining unit configured to determine whether each of the properties of the target word matches any of the different words and determine whether each of the properties of the target word matches any of the properties of the different words; and a determination unit configured to determine a representative property of the target word of the content on the basis of a match count between the properties of the target word and (a) the different words and (b) the properties of the different words determined by the property determining unit.

* * * * *